(12) United States Patent
Ando

(10) Patent No.: US 10,423,853 B2
(45) Date of Patent: Sep. 24, 2019

(54) INFORMATION-PROCESSING APPARATUS AND INFORMATION-PROCESSING METHOD FOR GENERATING DISTRIBUTION OF BRIGHTNESS-RELATED VALUE OF IMAGE DATA

(71) Applicant: CANON KABUSHIKI KAISHA, Tokyo (JP)

(72) Inventor: Muneki Ando, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 15/427,108

(22) Filed: Feb. 8, 2017

(65) Prior Publication Data

US 2017/0249528 A1  Aug. 31, 2017

(30) Foreign Application Priority Data

Feb. 25, 2016 (JP) ................. 2016-034487

(51) Int. Cl.
*G06K 9/38* (2006.01)
*G06T 5/00* (2006.01)
(Continued)

(52) U.S. Cl.
CPC ............. *G06K 9/38* (2013.01); *G06K 9/4642* (2013.01); *G06K 9/4661* (2013.01); *G06T 5/009* (2013.01); *G06T 5/40* (2013.01)

(58) Field of Classification Search
CPC ...... G06K 9/38; G06K 9/4642; G06K 9/4661; G06T 5/009; G06T 5/40; G06T 2207/20208
See application file for complete search history.

(56) References Cited

U.S. PATENT DOCUMENTS 5,495,168 A * 2/1996 de Vries ................. G01R 13/32
324/121 R
6,987,521 B2  1/2006 Mori et al.
(Continued)

FOREIGN PATENT DOCUMENTS

JP  07-38801 A  2/1995
JP  2008-122423 A  5/2008

OTHER PUBLICATIONS

Liu et al. ("Image characteristic oriented tone mapping for high dynamic range images," IEEE International Conference on Multimedia and Expo, Jun. 23-Apr. 26, 2008) (Year: 2008).*
(Continued)

*Primary Examiner* — Yubin Hung
(74) *Attorney, Agent, or Firm* — Venable LLP

(57) ABSTRACT

An information-processing apparatus includes: a first acquisition unit configured to acquire gradation characteristic information which relates to a gradation characteristic; a second acquisition unit configured to acquire axial characteristic information which relates to an axial characteristic including a distribution, on an axis, of graduations corresponding to brightness-related values related to brightness of input image data; and a generation unit configured to generate, based on the input image data, the gradation characteristic information, and the axial characteristic information, distribution information indicating a distribution of the brightness-related value of the input image data using the axis according to the axial characteristic information.

16 Claims, 16 Drawing Sheets

(51) Int. Cl.
*G06T 5/40* (2006.01)
*G06K 9/46* (2006.01)

(56) References Cited

U.S. PATENT DOCUMENTS

| | | | |
|---|---|---|---|
| 7,106,277 B2 | 9/2006 | Ando et al. | |
| 7,139,426 B2 | 11/2006 | Ivers et al. | |
| 7,551,777 B1* | 6/2009 | Pichumani | G01D 7/00 |
| | | | 382/168 |
| 7,561,171 B2 | 7/2009 | Mori et al. | |
| 8,179,406 B2 | 5/2012 | Mori et al. | |
| 2001/0036294 A1* | 11/2001 | Keskes | G01V 1/30 |
| | | | 382/109 |
| 2003/0152266 A1* | 8/2003 | Ivers | G01R 13/0218 |
| | | | 382/169 |
| 2004/0186673 A1* | 9/2004 | Agoston | G01R 13/0227 |
| | | | 702/70 |
| 2005/0190968 A1 | 9/2005 | Kanai et al. | |
| 2005/0200852 A1* | 9/2005 | Kimura | G01N 21/553 |
| | | | 356/445 |
| 2007/0093985 A1* | 4/2007 | Mizoguchi | G01H 1/003 |
| | | | 702/179 |
| 2009/0309879 A1* | 12/2009 | Gorbics | G01R 13/0227 |
| | | | 345/440.1 |
| 2010/0036294 A1* | 2/2010 | Mantell | A61B 17/22022 |
| | | | 601/4 |
| 2012/0162077 A1* | 6/2012 | Sze | G06F 3/0425 |
| | | | 345/163 |
| 2012/0207449 A1* | 8/2012 | Angquist | G11B 27/031 |
| | | | 386/278 |
| 2016/0100108 A1* | 4/2016 | Pytlarz | G11B 27/036 |
| | | | 386/280 |
| 2016/0330513 A1* | 11/2016 | Toma | H04N 5/57 |
| 2017/0061591 A1* | 3/2017 | Park | G09G 3/2092 |
| 2017/0180759 A1* | 6/2017 | Mertens | H04N 19/98 |

OTHER PUBLICATIONS

Qiu et al. ("An optimal tone reproduction curve operator for the display of high dynamic range images," IEEE International Symposium on Circuits and Systems, May 23-26, 2005) (Year: 2005).*

* cited by examiner

FIG. 2A

| NO INFORMATION | 0 |
| --- | --- |
| γ 2.2 | 1 |
| γ 2.4 | 2 |
| γ 2.6 | 3 |
| STANDARD A | 4 |
| STANDARD B | 5 |

FIG. 2B

| FIRST EOTF | SECOND EOTF |
| --- | --- |
| NOT DRAW | NOT DRAW |
| AUTOMATIC | AUTOMATIC |
| γ 2.2 | γ 2.2 |
| γ 2.4 | γ 2.4 |
| γ 2.6 | γ 2.6 |
| STANDARD A | STANDARD A |
| STANDARD B | STANDARD B |

FIG. 2C

| Liner | 0 |
| --- | --- |
| γ 2.2 | 1 |
| γ 2.4 | 2 |
| γ 2.6 | 3 |
| dB | 4 |
| Value | 5 |

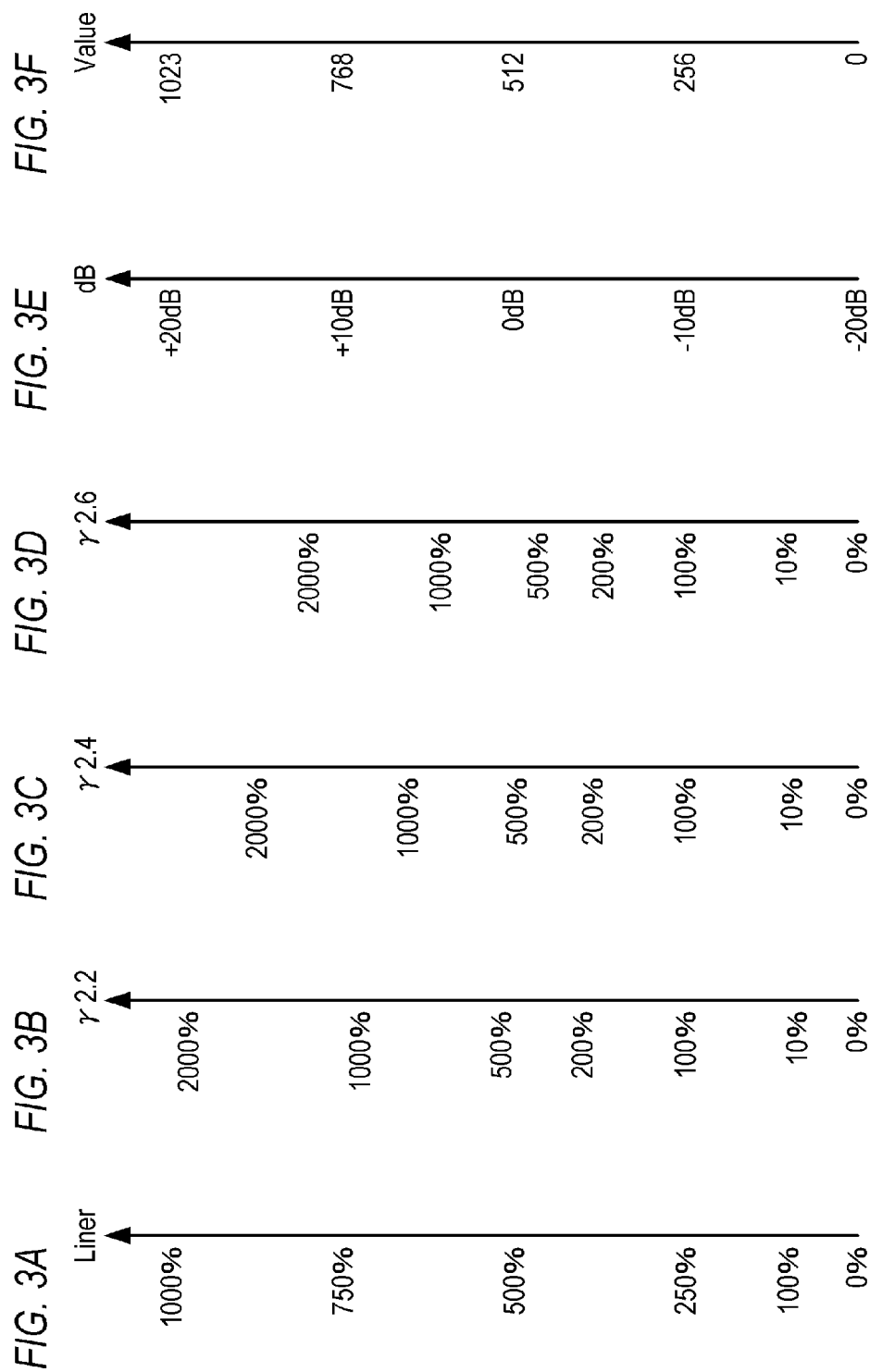

FIG. 4

| BRIGHTNESS-RELATED VALUE | | | | | | | | | | | |
|---|---|---|---|---|---|---|---|---|---|---|---|
| 255 | Hst(0,255) | Hst(1,255) | Hst(2,255) | Hst(3,255) | Hst(4,255) | ... | ... | Hst(1918,255) | Hst(1919,255) |
| 254 | Hst(0,254) | Hst(1,254) | Hst(2,254) | Hst(3,254) | Hst(4,254) | ... | ... | Hst(1918,254) | Hst(1919,254) |
| ... | ... | ... | ... | ... | ... | ⋰ | ⋰ | ... | ... |
| ... | ... | ... | ... | ... | ... | ⋰ | ⋰ | ... | ... |
| 5 | Hst(0,5) | Hst(1,5) | Hst(2,5) | Hst(3,5) | Hst(4,5) | ... | ... | Hst(1918,5) | Hst(1919,5) |
| 4 | Hst(0,4) | Hst(1,4) | Hst(2,4) | Hst(3,4) | Hst(4,4) | ... | ... | Hst(1918,4) | Hst(1919,4) |
| 3 | Hst(0,3) | Hst(1,3) | Hst(2,3) | Hst(3,3) | Hst(4,3) | ... | ... | Hst(1918,3) | Hst(1919,3) |
| 2 | Hst(0,2) | Hst(1,2) | Hst(2,2) | Hst(3,2) | Hst(4,2) | ... | ... | Hst(1918,2) | Hst(1919,2) |
| 1 | Hst(0,1) | Hst(1,1) | Hst(2,1) | Hst(3,1) | Hst(4,1) | ... | ... | Hst(1918,1) | Hst(1919,1) |
| 0 | Hst(0,0) | Hst(1,0) | Hst(2,0) | Hst(3,0) | Hst(4,0) | ... | ... | Hst(1918,0) | Hst(1919,0) |
|   | 0 | 1 | 2 | 3 | 4 | | | 1918 | 1919 |

HORIZONTAL POSITION

FIG. 10

| L | CatOut.N | CatOut.D | CatOut.Hi | CatOut.Lo |
|---|---|---|---|---|
| 0 | 0.00000 | 0 | 0 | 0.010627 |
| 1 | 0.00391 | 0.010627 | 0.010627 | 0.048828 |
| 2 | 0.00781 | 0.048828 | 0.048828 | 0.119144 |
| 3 | 0.01172 | 0.119144 | 0.119144 | 0.224355 |
| 4 | 0.01563 | 0.224355 | 0.224355 | 0.366554 |
| 5 | 0.01953 | 0.366554 | 0.366554 | 0.54744 |
| 6 | 0.02344 | 0.54744 | 0.54744 | 0.768457 |
| 7 | 0.02734 | 0.768457 | 0.768457 | 1.030866 |
| 8 | 0.03125 | 1.030866 | 1.030866 | 1.335788 |
| 9 | 0.03516 | 1.335788 | 1.335788 | 1.68424 |
| 10 | 0.03906 | 1.68424 | 1.68424 | 2.077151 |
| 11 | 0.04297 | 2.077151 | 2.077151 | 2.515375 |
| ... | ... | ... | ... | ... |
| ... | ... | ... | ... | ... |
| 63 | 0.24609 | 96.59469 | 96.59469 | 100 |
| 64 | 0.25000 | 100 | 100 | 103.4698 |
| ... | ... | ... | ... | ... |
| ... | ... | ... | ... | ... |
| 253 | 0.98828 | 2057.165 | 2057.165 | 2075.096 |
| 254 | 0.99219 | 2075.096 | 2075.096 | 2093.112 |
| 255 | 0.99609 | 2093.112 | 2093.112 | 2111.213 |
| 256 | 1.00000 | 2111.213 | | |

FIG. 12A

| L | CatInA.N | CatInA.D | CatInA.Hi | CatInA.Lo | CatInA.Mid | FLA |
|---|----------|----------|-----------|-----------|------------|-----|
| 0 | 0.00000 | 0 | 0 | 0.000604 | 0.000302 | 0 |
| 1 | 0.00391 | 0.000604 | 0.000604 | 0.002775 | 0.00169 | 0 |
| 2 | 0.00781 | 0.002775 | 0.002775 | 0.006772 | 0.004774 | 0 |
| 3 | 0.01172 | 0.006772 | 0.006772 | 0.012752 | 0.009762 | 1 |
| 4 | 0.01563 | 0.012752 | 0.012752 | 0.020835 | 0.016793 | 1 |
| 5 | 0.01953 | 0.020835 | 0.020835 | 0.031116 | 0.025975 | 1 |
| 6 | 0.02344 | 0.031116 | 0.031116 | 0.043679 | 0.037397 | 1 |
| 7 | 0.02734 | 0.043679 | 0.043679 | 0.058594 | 0.051136 | 2 |
| 8 | 0.03125 | 0.058594 | 0.058594 | 0.075925 | 0.06726 | 2 |
| 9 | 0.03516 | 0.075925 | 0.075925 | 0.095731 | 0.085828 | 2 |
| 10 | 0.03906 | 0.095731 | 0.095731 | 0.118064 | 0.106898 | 2 |
| 11 | 0.04297 | 0.118064 | 0.118064 | 0.142972 | 0.130518 | 3 |
| ... | ... | ... | ... | ... | ... | ... |
| 63 | 0.24609 | 7.320509 | 7.320509 | 7.578583 | 7.449546 | 19 |
| 64 | 0.25000 | 7.578583 | 7.578583 | 7.841541 | 7.710062 | 19 |
| ... | ... | ... | ... | ... | ... | ... |
| 253 | 0.98828 | 1177.579 | 1177.579 | 1185.035 | 1181.307 | 196 |
| 254 | 0.99219 | 1185.035 | 1185.035 | 1192.509 | 1188.772 | 197 |
| 255 | 0.99609 | 1192.509 | 1192.509 | 1200 | 1196.254 | 197 |
| 256 | 1.00000 | 1200 | | | | |

FIG. 12B

| L | CatInB.N | CatInB.D | CatInB.Hi | CatInB.Lo | CatInB.Mid | FLB |
|---|----------|----------|-----------|-----------|------------|-----|
| 0 | 0.00000 | 0 | 0 | 0.000503 | 0.000252 | 0 |
| 1 | 0.00391 | 0.000503 | 0.000503 | 0.002313 | 0.001408 | 0 |
| 2 | 0.00781 | 0.002313 | 0.002313 | 0.005643 | 0.003978 | 0 |
| 3 | 0.01172 | 0.005643 | 0.005643 | 0.010627 | 0.008135 | 0 |
| 4 | 0.01563 | 0.010627 | 0.010627 | 0.017362 | 0.013995 | 1 |
| 5 | 0.01953 | 0.017362 | 0.017362 | 0.02593 | 0.021646 | 1 |
| 6 | 0.02344 | 0.02593 | 0.02593 | 0.036399 | 0.031164 | 1 |
| 7 | 0.02734 | 0.036399 | 0.036399 | 0.048828 | 0.042613 | 1 |
| 8 | 0.03125 | 0.048828 | 0.048828 | 0.063271 | 0.05605 | 2 |
| 9 | 0.03516 | 0.063271 | 0.063271 | 0.079776 | 0.071524 | 2 |
| 10 | 0.03906 | 0.079776 | 0.079776 | 0.098387 | 0.089081 | 2 |
| 11 | 0.04297 | 0.098387 | 0.098387 | 0.119144 | 0.108765 | 2 |
| ... | ... | ... | ... | ... | ... | ... |
| 63 | 0.24609 | 4.575318 | 4.575318 | 4.736614 | 4.655966 | 15 |
| 64 | 0.25000 | 4.736614 | 4.736614 | 4.900963 | 4.818789 | 16 |
| ... | ... | ... | ... | ... | ... | ... |
| 253 | 0.98828 | 97.43999 | 97.43999 | 98.2893 | 97.86465 | 63 |
| 254 | 0.99219 | 98.2893 | 98.2893 | 99.14264 | 98.71597 | 63 |
| 255 | 0.99609 | 99.14264 | 99.14264 | 100 | 99.57132 | 63 |
| 256 | 1.00000 | 100 | | | | |

*FIG. 13*
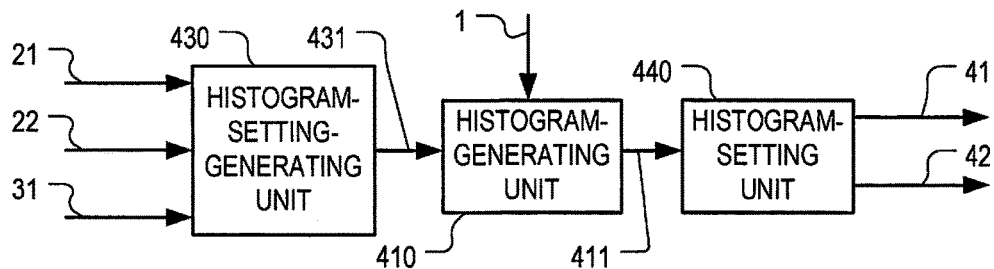
*FIG. 14*
| FL | CatP.Lo | CatP.Hi |
|---|---|---|
| 0 | 0 | 3 |
| 1 | 4 | 6 |
| 2 | 7 | 10 |
| ... | ... | ... |
| 19 | 63 | 64 |
| ... | ... | ... |
| 197 | 254 | 255 |
| 198 | 256 | 256 |
| ... | ... | ... |
| 255 | 256 | 256 |
*FIG. 15*
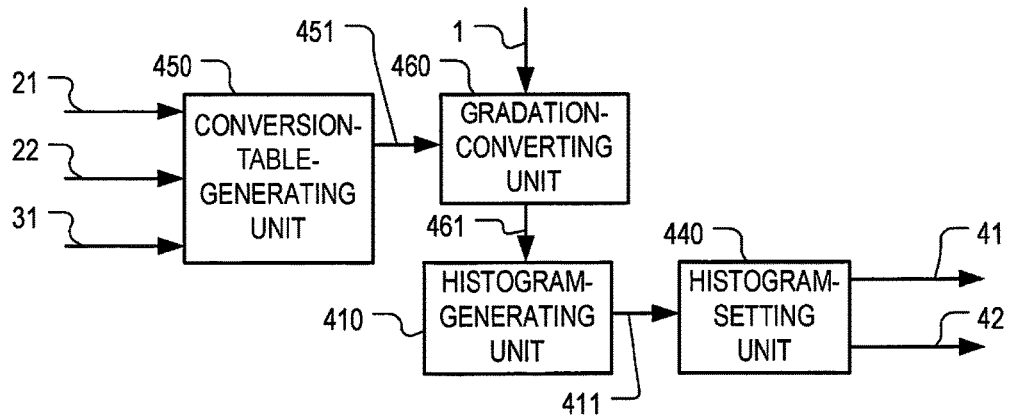

FIG. 16

| L | FLA |
|---|---|
| 0 | 0 |
| 1 | 7 |
| 2 | 10 |
| 3 | 13 |
| 4 | 14 |
| 5 | 16 |
| 6 | 17 |
| 7 | 19 |
| 8 | 20 |
| 9 | 21 |
| 10 | 22 |
| 11 | 23 |
| ... | ... |
| ... | ... |
| 63 | 51 |
| 64 | 52 |
| ... | ... |
| ... | ... |
| 253 | 97 |
| 254 | 97 |
| 255 | 97 |

INFORMATION-PROCESSING APPARATUS AND INFORMATION-PROCESSING METHOD FOR GENERATING DISTRIBUTION OF BRIGHTNESS-RELATED VALUE OF IMAGE DATA

BACKGROUND OF THE INVENTION

Field of the Invention

The present invention relates to an information-processing apparatus and an information-processing method.

Description of the Related Art

For the purpose of enabling immediate, intuitive grasp of a brightness distribution of image data, a waveform monitor apparatus is generally used. In a waveform monitor apparatus, a two-dimensional histogram of image data is acquired and a waveform is displayed in the manner of an oscilloscope (see Japanese Patent Application Publication No. H7-38801). Moreover, a digital oscilloscope capable of performing variable-density display of a waveform is also available. As a technique related to such a digital oscilloscope, a technique of normalizing the distribution of data values of input data so that a density distribution of a waveform is easily observed has been proposed (Japanese Patent Application Publication No. 2008-122423).

In photographing, the gradation characteristics γ2.2 to γ2.6 which are standards stipulated by ITU-R Rec.BT.709, DCI, etc., are often used as an optical-electro transfer function (OETF). In photographing, the optical-electro transfer function is a characteristic for converting a brightness-related value (a value related to brightness), obtained by sensors, to a data value of image data. Meanwhile, the characteristic for converting a data value to a display brightness-related value is referred to as an "electro-optical transfer function (EOTF)". The gradation characteristic is a correspondence relation between the brightness-related value and the data value.

Currently, the use of new gradation characteristics as exemplified by SMPTE ST2084, ARIB STD-B67, etc., is becoming increasingly widespread. Such a new gradation characteristic is used as the EOTF of an image display apparatus capable of displaying images in a high dynamic range (HDR), for example. The HDR is a wider dynamic range than a general dynamic range (standard dynamic range: SDR). HDR supports a high brightness that SDR does not support.

However, in a case where the conventional waveform monitor apparatus described above is used, users cannot easily have an accurate grasp of a brightness distribution of image data having nonlinear EOTF as exemplified by SMPTE ST2084, ARIB STD-B67, etc. More specifically, it is difficult for users to have an acute sense for contrasts in a high brightness range. This is because in such a high brightness range of EOTF, the inclination of the change in the brightness-related value in relation to the change in the data value is very steep.

Although there is an increasing demand for simultaneously using a plurality of different EOTFs, in a case where the conventional waveform monitor is used, it is not easy for users to accurately compare a plurality of brightness distributions corresponding to the plurality of EOTFs.

SUMMARY OF THE INVENTION

The present invention provides a technique for improving the convenience with which information indicating a brightness distribution of image data is used.

The present invention in its first aspect provides an information-processing apparatus comprising:

a first acquisition unit configured to acquire gradation characteristic information which is information related to a gradation characteristic;

a second acquisition unit configured to acquire axial characteristic information which is information related to an axial characteristic including a distribution, on an axis, of graduations corresponding to brightness-related values related to brightness of input image data; and a generation unit configured to generate, based on the input image data, the gradation characteristic information, and the axial characteristic information, distribution information indicating a distribution of the brightness-related value of the input image data using the axis according to the axial characteristic information.

The present invention in its second aspect provides an information-processing method comprising:

acquiring gradation characteristic information which is information related to a gradation characteristic;

acquiring axial characteristic information which is information related to an axial characteristic including a distribution, on an axis, of graduations corresponding to brightness-related values related to brightness of input image data; and generating, based on the input image data, the gradation characteristic information, and the axial characteristic information, distribution information indicating a distribution of the brightness-related value of the input image data using the axis according to the axial characteristic information.

The present invention in its third aspect provides a non-transitory computer readable medium that stores a program, wherein the program causes a computer to execute:

acquiring gradation characteristic information which is information related to a gradation characteristic;

acquiring axial characteristic information which is information related to an axial characteristic including a distribution, on an axis, of graduations corresponding to brightness-related values related to brightness of input image data; and generating, based on the input image data, the gradation characteristic information, and the axial characteristic information, distribution information indicating a distribution of the brightness-related value of the input image data using the axis according to the axial characteristic information.

According to the present invention, it is possible to improve the convenience with which information indicating a brightness distribution of image data is used.

Further features of the present invention will become apparent from the following description of exemplary embodiments with reference to the attached drawings.

BRIEF DESCRIPTION OF THE DRAWINGS

FIGS. 2A to 2C are diagrams illustrating an example of an EOTF and an axial characteristic according to the first embodiment;

FIGS. 3A to 3F are diagrams illustrating examples of a vertical axis according to the first embodiment;

FIG. 4 is a diagram illustrating an example of a data structure of waveform information according to the first embodiment;

FIG. 10 is a diagram illustrating an example of a processing result of S4202 in FIG. 8;

FIGS. 12A and 12B are diagrams illustrating examples of the calculation results of a first brightness range and a second brightness range according to the first embodiment;

FIG. 13 is a block diagram illustrating an example of a functional configuration of a waveform-information-generating unit according to a second embodiment;

FIG. 14 is a diagram illustrating an example of a data structure of a histogram setting table according to the second embodiment;

FIG. 15 is a block diagram illustrating an example of a functional configuration of a waveform-information-generating unit according to a third embodiment;

FIG. 16 is a diagram illustrating an example of a data structure of a gradation conversion table according to the third embodiment;

DESCRIPTION OF THE EMBODIMENTS

First Embodiment

Hereinafter, a first embodiment of the present invention will be described. An information-processing apparatus according to the present embodiment generates distribution information. The distribution information is information indicating a distribution of a brightness-related value related to the brightness of input image data using an axis (first axis) having graduations corresponding to the brightness-related values. In the present embodiment, an example in which information (waveform information) on a waveform indicating a distribution of a brightness-related value is generated as distribution information using the first axis and a second axis having graduations corresponding to the positions in an image is described.

Although an example in which an information-processing apparatus is provided in an image display apparatus capable of displaying a distribution image based on distribution information generated by the information-processing apparatus is described in the following description, the information-processing apparatus may be an apparatus independent from the image display apparatus. The distribution image is an image indicating the distribution of a brightness-related value. For example, a personal computer (PC) independent from the image display apparatus may be used as the information-processing apparatus. A liquid-crystal display apparatus, an organic EL display apparatus, a plasma display apparatus, a MEMS shutter-type display apparatus having a microelectromechanical system (MEMS) shutter as a display element, and other display apparatuses can be used as the image display apparatus. The image display apparatus may be a waveform monitor apparatus.

Although an example in which the first axis is a vertical axis and the second axis is a horizontal axis is described in the following description, the direction of the axis is not particularly limited. For example, the first axis may be a horizontal axis. Moreover, although an example in which the graduations of the second axis corresponds to horizontal positions (the positions in a horizontal direction) in an image is described in the following description, the graduations of the second axis is not limited to this. For example, the graduations of the second axis may correspond to vertical positions (the positions in a vertical direction) in an image.

Figure 1:
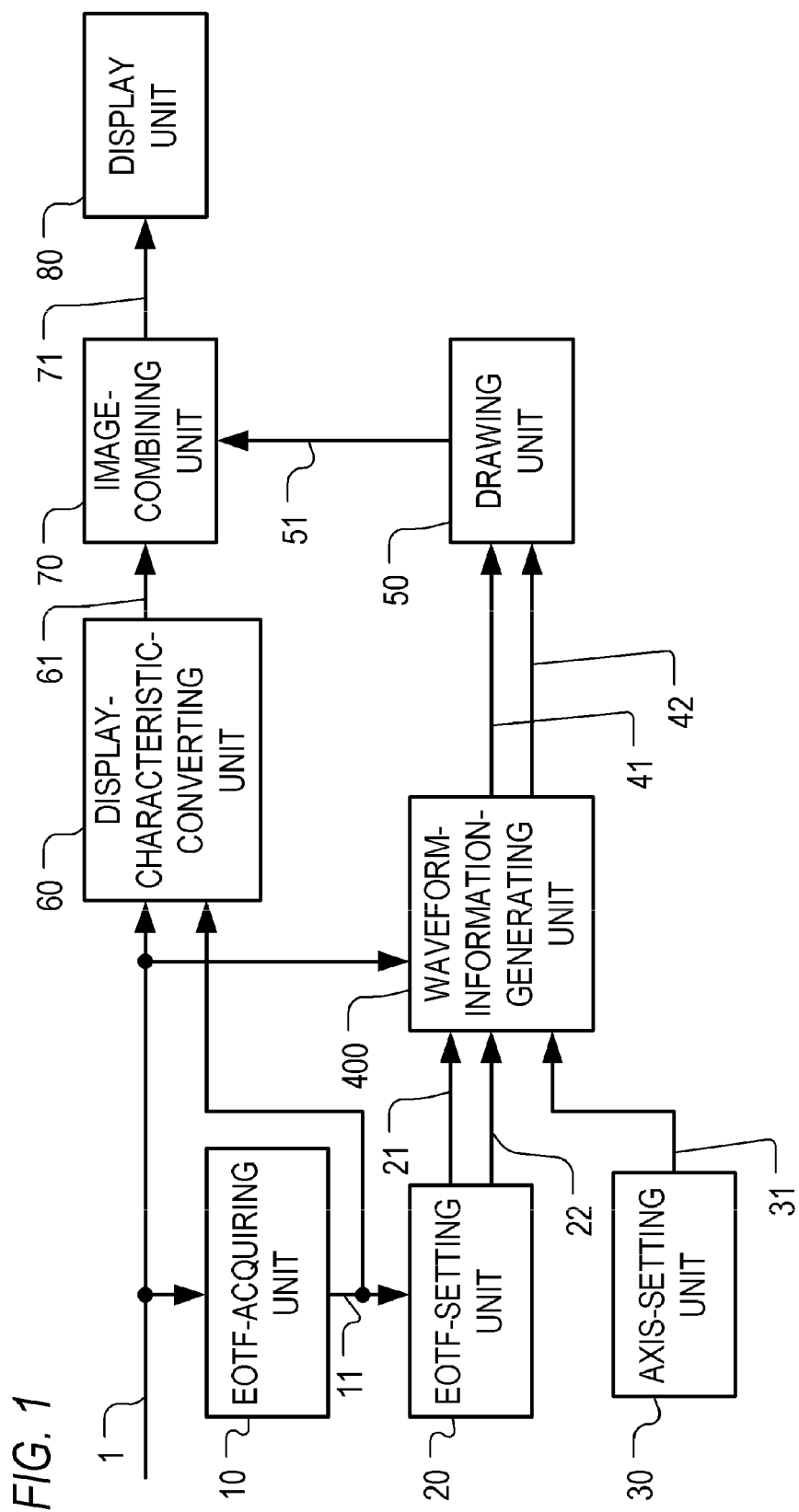
FIG. 1 is a block diagram illustrating an example of a functional configuration of an image display apparatus according to a first embodiment.

FIG. 1 is a block diagram illustrating an example of a functional configuration of an image display apparatus according to the present embodiment. As illustrated in FIG. 1, an image display apparatus according to the present embodiment includes an EOTF-acquiring unit 10, an EOTF-setting unit 20, an axis-setting unit 30, a waveform-information-generating unit 400, a drawing unit 50, a display-characteristic-converting unit 60, an image-combining unit 70, and a display unit 80. In a case where the information-processing apparatus is an apparatus independent from the image display apparatus, the display unit 80 is provided in the image display apparatus. The EOTF-acquiring unit 10, the EOTF-setting unit 20, the axis-setting unit 30, the waveform-information-generating unit 400, the drawing unit 50, the display-characteristic-converting unit 60, and the image-combining unit 70 may be, or may not be, individual hardware components. The functions of two or more functional units may be realized by a common hardware component. In a case where the information-processing apparatus is an apparatus independent from the image display apparatus, at least one of the display-characteristic-converting unit 60 and the image-combining unit 70 may be provided in the image display apparatus.

Input image data 1 is image data input to the image display apparatus. The input image data 1 is input to the image display apparatus using, for example, an input unit (an input terminal or the like) which is not illustrated. In the present embodiment, the pixel value of the input image data 1 is an RGB value, and the data value (R, G, and B-values, and the like) of the input image data 1 is a 10-bit value (0 to 1023). The image size (resolution) of the input image data 1 is the number of pixels in the horizontal direction x the number of pixels in the vertical direction (that is, 1920× 1080). However, the data format, the image size, and the like of the input image data 1 are not particularly limited. For example, the pixel value of the input image data 1 may be a YCbCr value. The number of bits of the data value of the input image data 1 may be larger or smaller than 10 bits. The image size of the input image data 1 may be smaller or larger than 1920×1080.

The EOTF-acquiring unit 10 acquires information on the EOTF pre-associated with the input image data 1 and outputs input characteristic information 11 corresponding to the acquired information. In the present embodiment, the EOTF information is added to the input image data 1 as metadata or the like, and the EOTF-acquiring unit 10 acquires the information (the information on EOTF) added to the input image data 1 from the input image data 1. The EOTF is correspondence relation between a brightness-related value and a data value and can be referred to as a "gradation characteristic". The input characteristic information 11 is the information on EOTF pre-associated with the input image data 1. The information on the EOTF can be referred to as "gradation characteristic information", "EOTF information", or the like. Due to this, the input characteristic information can be referred to as "gradation characteristic information", "EOTF information", or the like.

In the present embodiment, the EOTF-acquiring unit 10 outputs a code corresponding to the EOTF pre-associated with the input image data 1 as the input characteristic information 11. FIG. 2A illustrates an example of correspondence relation between EOTF and a code. In the example of FIG. 2A, code "1" is corresponded to EOTF "γ2.2", code "2" is corresponded to EOTF "γ2.4", code "3" is corresponded to EOTF "γ2.6", code "4" is corresponded to EOTF "Standard A", and code "5" is corresponded to EOTF "Standard B". Due to this, in a case where the EOTF pre-associated with the input image data 1 is any one of "γ2.2", "γ2.4", "γ2.6", "Standard A", and "Standard B", any one of "1" to "5" is output as the input characteristic information 11. In a case where the EOTF information is not added to the input image data 1, code "0" corresponding to "No information" is output as the input characteristic information 11.

The data format of the information (the information on EOTF) added to the input image data 1 may be the same as or different from the data format of the input characteristic information 11. That is, the EOTF-acquiring unit 10 may output the acquired information as the input characteristic information 11 and may convert the data format of the acquired information and output the information after conversion as the input characteristic information 11.

The EOTF-setting unit 20 acquires drawing characteristic information which is the EOTF information (gradation characteristic information) (this acquiring is referred to as first acquisition) and outputs the acquired drawing characteristic information. The drawing characteristic information is information on the EOTF considered in a case of generating waveform information, which will be described in detail later.

In the present embodiment, the EOTF-setting unit 20 acquires information on the EOTF designated (selected) by a user as drawing characteristic information. The user designates the EOTF using, for example, a user interface (UI) unit (not illustrated). In the present embodiment, two EOTFs at most are designated by the user. The EOTF-setting unit 20 outputs first drawing characteristic information 21 which is information on a first designated EOTF (first EOTF) and second drawing characteristic information 22 which is information on a second designated EOTF (second EOTF). FIG. 2B illustrates an example of the options of the first EOTF and the options of the second EOTF. In the example of FIG. 2B, the user can select "γ2.2", "γ2.4", "γ2.6", "Standard A", "Standard B", "Not draw", or "Automatic" as the first EOTF. Similarly, the user can select "γ2.2", "γ2.4", "γ2.6", "Standard A", "Standard B", "Not draw", or "Automatic" as the second EOTF.

In the present embodiment, the EOTF-setting unit 20 outputs a code corresponding to the EOTF as the drawing characteristic information. In a case where any one of "γ2.2", "γ2.4", "γ2.6", "Standard A", and "Standard B" is designated, a code (any one of "1" to "5") corresponding to the designated EOTF is output as the drawing characteristic information. In a case where "Not draw" is designated, "0" which is the code of "No information" is output. Moreover, in a case where "Automatic" is designated, the same information (code) as the input characteristic information 11 is output as the drawing characteristic information. In a case where the EOTF information is not added to the input image data 1, "Automatic" cannot be designated.

The EOTF information (the input characteristic information 11 and the drawing characteristic information) is not limited to the above-described codes. For example, a character string such as the name of EOTF may be used as the EOTF information. A character string such as "No information" may be used as the EOTF information of "No information". A function or a table indicating the EOTF (the correspondence relation between a brightness-related value and a data value) may be used as the EOTF information. The data format of the input characteristic information 11 may be different from the data format of the drawing characteristic information.

The candidates for the EOTF (that is, the EOTF related to the EOTF information) which is assumed to be used in the image display apparatus (the information-processing apparatus) are not limited to the five EOTFs "γ2.2", "γ2.4", "γ2.6", "Standard A", and "Standard B". At least one of "γ2.2", "γ2.4", "γ2.6", "Standard A", and "Standard B" may not be assumed to be used in the image display apparatus. Other EOTFs different from "γ2.2", "γ2.4", "γ2.6", "Standard A", and "Standard B" may be assumed to be used in the image display apparatus. The number of types of EOTFs assumed to be used in the image display apparatus may be larger or smaller than 5.

The number of types of EOTFs that a user can designate simultaneously may be larger or smaller than 2. Moreover, a method of acquiring the drawing characteristic information is not limited to the above-described method. For example, the input characteristic information 11 may be acquired as the drawing characteristic information rather than allowing the user to designate the EOTF. The acquired drawing characteristic information may be switched according to the type of the input image data 1, an operation mode of the image display apparatus, the use environment of the image display apparatus, and the like.

The axis-setting unit 30 acquires axial characteristic information 31 which is information related to axial characteristic of the vertical axis (the first axis) (this acquiring is referred to as second acquisition) and outputs the axial characteristic information 31. In the present embodiment, the axis-setting unit 30 acquires information on the axial characteristic designated (selected) by the user as the axial characteristic information 31 and outputs the axial characteristic information 31. The user designates an axial characteristic using a user interface (UI) unit (not illustrated), for example. In the present embodiment, the axis-setting unit 30 outputs a code corresponding to the designated axial characteristic as the axial characteristic information 31. FIG. 2C illustrates an example of correspondence relation between a code and an option of the axial characteristic. In the example of FIG. 2C, code "0" is corresponded to axial characteristic "Liner", code "1" is corresponded to axial characteristic "γ2.2", code "2" is corresponded to axial characteristic "γ2.4", and code "3" is corresponded to axial characteristic "γ2.6". Moreover, code "4" is corresponded to axial characteristic "dB" and code "5" is corresponded to axial characteristic "Value". In the example of FIG. 2C, the user can select "Liner", "γ2.2", "γ2.4", "γ2.6", "dB", or "Value" as the axial characteristic. Anyone of "0" to "6" is output from the axis-setting unit 30 as the axial characteristic information 31.

The axial characteristic information 31 is not limited to the above-described codes. For example, a character string such as the name of the axial characteristic may be used as the axial characteristic information 31. A function or a table indicating the correspondence relation between the graduations positions and the graduations values may be used as the axial characteristic information 31. Moreover, a method of acquiring the axial characteristic information 31 is not limited to the above-described method. For example, the acquired axial characteristic information 31 may be switched according to the type of the input image data 1, the operation mode of the image display apparatus, the use environment of the image display apparatus, and the like.

The candidates for the axial characteristic (that is, the axial characteristic related to the axial characteristic information 31) which is assumed to be used in the image display apparatus (the information-processing apparatus) are not limited to the six axial characteristics. At least one of "Liner", "γ2.2", "γ2.4", "γ2.6", "dB", and "Value" may not be assumed to be used in the image display apparatus. Other axial characteristics different from "Liner", "γ2.2", "γ2.4", "γ2.6", "dB", and "Value" may be assumed to be used in the image display apparatus. The number of types of axial characteristics assumed to be used in the image display apparatus may be larger or smaller than 6.

FIGS. 3A to 3F are conceptual diagrams illustrating examples of the vertical axis. FIG. 3A illustrates an example of the vertical axis having the axial characteristic "Liner". In FIG. 3A, the percentage (%) of brightness to a first reference brightness is used as a brightness-related value. The first reference brightness is an upper limit brightness of the general dynamic range (standard dynamic range: SDR), for example. In FIG. 3A, graduations are arranged in a distribution corresponding to the EOTF which is a linear characteristic. For example, in FIG. 3A, graduations are arranged so that the interval between brightness-related values is constant. The first reference brightness is not limited to the upper limit brightness of SDR. The first reference brightness may be higher or lower than the upper limit brightness of SDR.

FIG. 3B illustrates an example of the vertical axis having the axial characteristic "γ2.2". In FIG. 3B, the percentage (%) of brightness to the first reference brightness is also used as the brightness-related value. In FIG. 3B, graduations are arranged in a distribution corresponding to the EOTF "γ2.2". In FIG. 3B, for example, graduations are arranged so that the interval between brightness-related values increases exponentially with the increase in the brightness-related value.

FIG. 3C illustrates an example of the vertical axis having the axial characteristic "γ2.4" and FIG. 3D illustrates an example of the vertical axis having the axial characteristic "γ2.6". In FIGS. 3C and 3D, the percentage (%) of brightness to the first reference brightness is also used as the brightness-related value. In FIG. 3C, graduations are arranged in a distribution corresponding to the EOTF "γ2.4". In FIG. 3D, graduations are arranged in a distribution corresponding to the EOTF "γ2.6". Due to this, in FIGS. 3B to 3D, the interval between brightness-related values increases in different manners.

FIG. 3E illustrates an example of the vertical axis having the axial characteristic "dB". In FIG. 3E, a value (dB) which represents a relative value of brightness to a second reference brightness by a logarithmic function is used as a brightness-related value. The second reference brightness is the same brightness as the first reference brightness, for example. In FIG. 3E, graduations are arranged in such a distribution that the vertical axis is a logarithmic axis. The second reference brightness may be different from the first reference brightness. The second reference brightness may be higher or lower than the first reference brightness.

FIG. 3F illustrates an example of the vertical axis having the axial characteristic "Value". In FIG. 3F, a data value of image data is used as a brightness-related value. In FIG. 3F, graduations are arranged in a distribution corresponding to the EOTF which is a linear characteristic.

As described above, in the present embodiment, the axial characteristic of the vertical axis includes a distribution of graduations of the vertical axis and the type of a brightness-related value (the graduations of the vertical axis). The axial characteristic of the vertical axis may include at least the distribution of the graduations of the vertical axis. The type of the brightness-related value may be common to all axial characteristics. Another characteristic may be included in the axial characteristic of the vertical axis. A brightness ($cd/m^2$) may be used as the brightness-related value.

The waveform-information-generating unit 400 generates waveform information based on the input image data 1, the drawing characteristic information, and the axial characteristic information 31. In the present embodiment, information relating to a waveform which represents a distribution of a brightness-related value related to a brightness of the input image data 1 in a case where the EOTF related to the drawing characteristic information is used as the EOTF of the input image data 1 using the vertical axis having the axial characteristic related to the axial characteristic information 31 is generated. Moreover, in the present embodiment, the first wave form information 41 and the second wave form information 42 are generated based on the input image data 1, the first drawing characteristic information 21, the second drawing characteristic information 22, and the axial characteristic information 31. The first waveform information 41 is waveform information corresponding to the first drawing characteristic information, and the second waveform information 42 is waveform information corresponding to the second drawing characteristic information. In the first waveform information 41 and the second waveform information 42, a vertical axis having the axial characteristic related to the axial characteristic information 31 is used in order to represent the distribution of the brightness-related value. That is, the vertical axis used for representing the distribution of the brightness-related value is common between the first wave form information 41 and the second wave form information 42.

Although the data format of the waveform information is not particularly limited, a two-dimensional histogram having a first graduations category and a second graduations category is generated as the waveform information. Specifically, a data array indicating the two-dimensional histogram is generated as the waveform information. The first graduations category is a category of the graduations (the value corresponding to the brightness-related value) of the vertical axis having the axial characteristic related to the axial characteristic information 31, and the second graduations category is a category of the graduations (the value corresponding to a horizontal position of an image) of the horizontal axis. Hereinafter, an element of the data array which is the first waveform information 41 will be denoted by "HstA(X, L)" and an element of the data array of the second waveform information 42 will be denoted by "HstB (X, L)". In the elements HstA(X, L) and HstB(X, L), "L" is the first graduations category and "X" is the second graduations category. The value of the element HstA(X, L) is the number of pixels in which the value (category) of the graduations corresponding to the horizontal positions is the category X and the value (category) of the graduations corresponding to the brightness-related values is the category L. Similarly, the value of the element HstB(X, L) is the number of pixels in which the value of the graduations corresponding to the horizontal positions is the category X and the value of the graduations corresponding to the brightness-related values is the category L. FIG. 4 illustrates a conceptual diagram of a data structure of a two-dimensional histogram which is waveform information. In FIG. 4, "Hst(X, L)" means the element HstA(X, L) or HstB(X, L).

The drawing unit 50 generates waveform image data 51 based on waveform information and outputs the waveform image data 51. The waveform image data 51 is image data indicating a waveform image (an image of a waveform represented by the waveform information) as a distribution image. The waveform image data 51 is generated by drawing the waveform image on a virtual screen of a video memory (not illustrated), for example.

In the present embodiment, image data representing a first waveform image which is a waveform image based on the first waveform information 41 and a second waveform image which is a waveform image based on the second waveform information 42 is generated as the waveform image data 51. Moreover, in the present embodiment, the second waveform image is drawn in the same image region as an image region in which the first waveform image is drawn. That is, in the present embodiment, the waveform image data 51 is generated so that two waveforms are depicted by one graph (a graph of which the vertical axis has graduations corresponding to the brightness-related values and the horizontal axis has graduations corresponding to the positions in an image).

Figure 5:
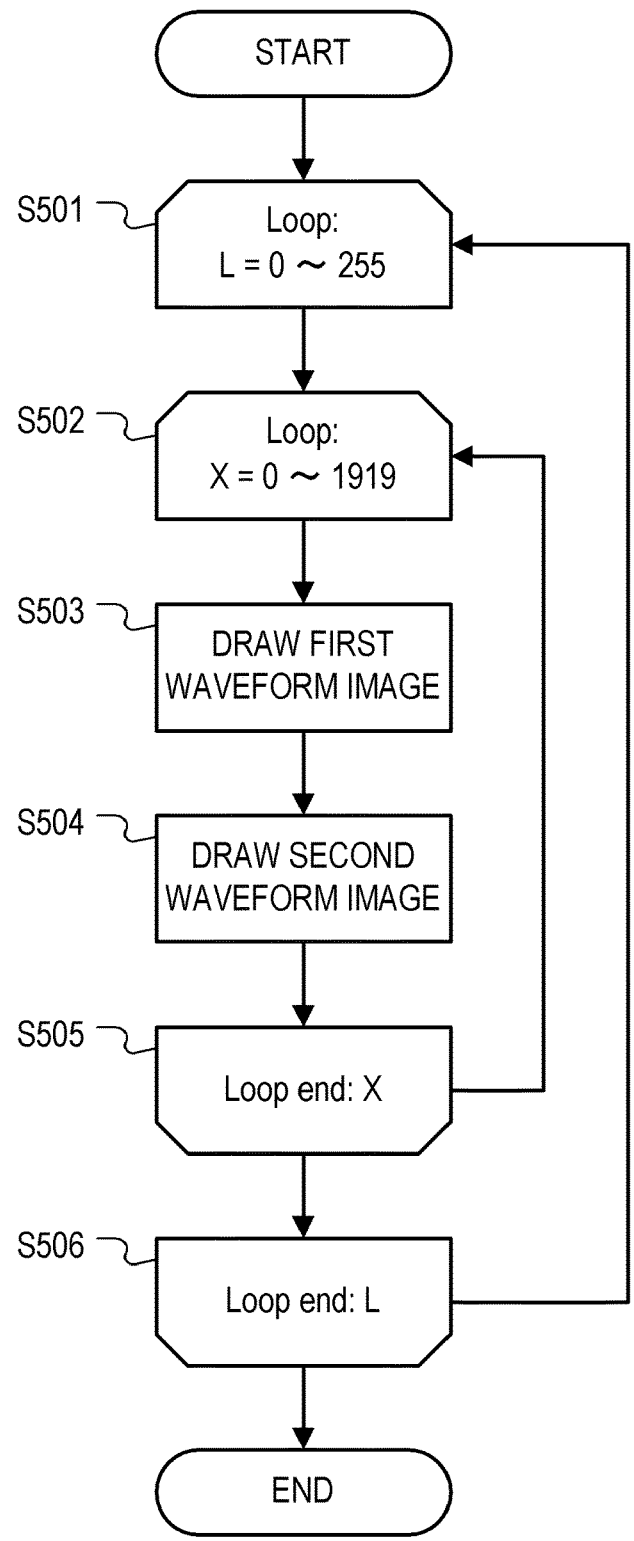
FIG. 5 is a flowchart illustrating an example of a processing flow of a drawing unit according to the first embodiment.

FIG. 5 is a flowchart illustrating an example of a processing flow of the drawing unit 50. First, in S501, the drawing unit 50 selects the value of a loop variable L. The loop variable L is used as the category L. The process of S501 is a process of a loop starting end of the loop variable L. In the present embodiment, the drawing unit 50 sequentially selects the values 0 to 255 as the loop variable L. Subsequently, in S502, the drawing unit 50 selects the value of the loop variable X. The loop variable X is used as the category X. The process of S502 is a process of a loop starting end of the loop variable X. In the present embodiment, the drawing unit 50 sequentially selects the values 0 to 1919 as the loop variable X.

In S503, the drawing unit 50 draws the first waveform image which is a waveform image based on the first waveform information 41. Specifically, the drawing unit 50 draws (plots) a bright spot of white at the position of the coordinate ((coordinate value of horizontal position, coordinate value of vertical position)=(X, 255−L)) of the virtual screen. The brightness of the bright spot may be changed according to the value (the number of pixels) of the element HstA(X, L). However, in a case where the value of the element HstA(X, L) is 0, the process of S503 is omitted. Subsequently, in S504, the drawing unit 50 draws the second waveform image which is a waveform image based on the second waveform information 42. Specifically, the drawing unit 50 draws (plots) a bright spot of red at the position of the coordinate (X, 255−L) of the virtual screen. The brightness of the bright spot may be changed according to the value (the number of pixels) of the element HstB(X, L). However, in a case where the value of the element HstB(X, L) is 0, the process of S504 is omitted.

After that, the process of S505 is performed. The process of S505 is a process of a loop terminating end of the loop variable X. In S505, the drawing unit 50 determines whether a loop variable X which is not selected as the loop variable X corresponding to the loop variable L selected in S501 is present. In a case where a non-selected loop variable X is present, the flow returns to the process of S502. The processes of S502 to S505 are repeated until all loop variables X are selected, and the flow proceeds to S506 after all loop variables X are selected.

The process of S506 is a process of a loop terminating end of the loop variable L. In S506, the drawing unit 50 determines whether a non-selected loop variable L is present. In a case where a non-selected loop variable L is present, the flow returns to the process of S501. The processes of S501 to S506 are repeated until all loop variables L are selected, and this flow ends after all loop variables L are selected.

By the above-described processes, the first waveform image is drawn white and the second waveform image is drawn red on the virtual screen. Moreover, the image data indicating the first waveform image which is white and the second waveform image which is red is generated as the waveform image data 51. The colors of the waveform image are not limited to white and red. Moreover, the numerical range of the loop variable L (the category L) may be narrower or wider than the numerical range of 0 to 255. The numerical range of the loop variable X (the category X) may be narrower or wider than the numerical range of 0 to 1919.

The display-characteristic-converting unit 60 converts the data values of the input image data 1 using the EOTF related to the input characteristic information 11 as the EOTF of the input image data 1 so that the EOTF of the input image data 1 complies with the display characteristic of the display unit 80. As a result, display image data 61 is generated and the display image data 61 is output from the display-characteristic-converting unit 60. A one-dimensional lookup table (1D-LUT), for example, is used for the conversion of the data value.

The image-combining unit 70 generates combined image data 71 by combining the waveform image data 51 with the display image data 61. Moreover, the image-combining unit 70 outputs the combined image data 71. An image represented by the display image data 61 and a waveform image represented by the waveform image data 51 are arranged in an image (combined image) represented by the combined image data 71.

The display unit 80 displays an image corresponding to the combined image data 71 on a screen. In the present embodiment, the screen resolution of the display unit 80 is 1920×1080 which is the same as the image resolution of the input image data 1. The screen size of the display unit 80 is 20 inches. The screen resolution of the display unit 80 is higher or lower than the image resolution of the input image data 1. The screen size of the display unit 80 may be larger or smaller than 20 inches.

The conversion by the display-characteristic-converting unit 60 may be performed after the combining by the image-combining unit 70. For example, first, the waveform image data may be combined with the input image data 1 by the image-combining unit 70. Subsequently, the display image data may be generated by the display-characteristic-converting unit 60 converting the data value of the combined image data obtained by combining the waveform image data with the input image data 1. Moreover, an image corresponding to the display image data may be displayed on the screen by the display unit 80.

Next, the details of the waveform-information-generating unit 400 will be described. A method of generating the waveform information is not particularly limited as long as the method generates the waveform information using the input image data 1, the drawing characteristic information, and the axial characteristic information 31. In the present embodiment, the waveform-information-generating unit 400 determines, based on the drawing characteristic information, a corresponding brightness which is a brightness corresponding to a data value that the input image data 1 can take and which is a brightness in a case where the EOTF related to the drawing characteristic information is used. Moreover, the waveform-information-generating unit 400 generates waveform information based on the input image data 1, the determination result of the corresponding brightness, and the axial characteristic information. In the waveform-information-generating unit 400, the R-value, the G-value, the B-value, the Y-value, and the like are used as the data value, for example. In a case where the pixel value of the input image data 1 is the RGB value, the Y-value may be calculated from the RGB value of the input image data 1 and the calculated Y-value may be used as the data value of the input image data 1.

Figure 6:
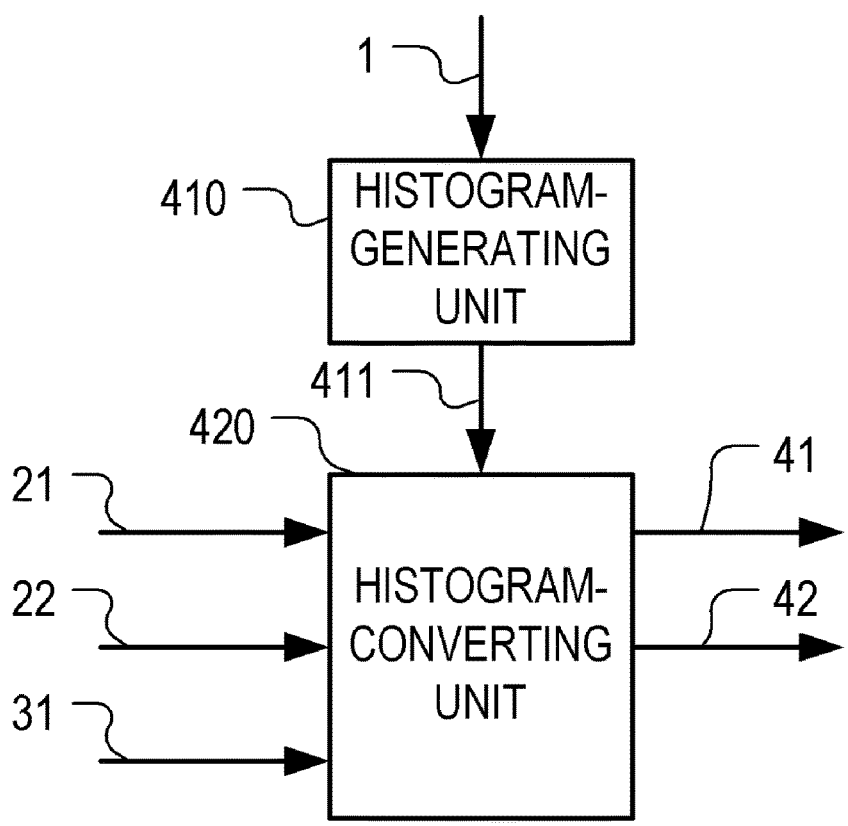
FIG. 6 is a block diagram illustrating an example of a functional configuration of a waveform-information-generating unit according to the first embodiment.

FIG. 6 is a block diagram illustrating an example of a functional configuration of the waveform-information-generating unit 400. As illustrated in FIG. 6, the waveform-information-generating unit 400 includes a histogram-generating unit 410 and a histogram-converting unit 420. The histogram-generating unit 410 and the histogram-converting unit 420 may be, or may not be, individual hardware components. The function of the histogram-generating unit 410 and the function of the histogram-converting unit 420 may be realized by a common hardware component.

The histogram-generating unit 410 generates a histogram (original histogram) 411 of the data value of the input image data 1 based on the input image data 1. In the present embodiment, a two-dimensional histogram having the second graduations category and a data category which is the category of the data value is generated as the original histogram 411. Moreover, the histogram-generating unit 410 outputs the original histogram 411. The data structure of the original histogram 411 is the same as the data structure illustrated in FIG. 4. Hereinafter, an element of the original histogram 411 (the data array) will be denoted by "HstO(X, L)". In the element HstO(X, L), "L" is a data category and "X" is a second graduations category. The value of the element HstO(X, L) is the number of pixels in which the value of the graduations corresponding to the horizontal positions is the category X and the value of the graduations corresponding to the brightness-related values is the category L.

As described above, the data value P (X, Y) of the input image data 1 is a 10-bit value (0 to 1023), the category L has a value of 0 to 255, and the number of values that the category L can take is 256. Due to this, in the present embodiment, in a case where the original histogram 411 is generated, the data value P(X, Y) of the input image data 1 is multiplied by ¼. In the data value P(X, Y), "X" is the coordinate value of the horizontal position of a pixel and "Y" is the coordinate value of the vertical position of a pixel. In the present embodiment, "X" which is the coordinate value is equal to "X" which is the second graduations category. Here, "X" which is the coordinate value may be different from "X" which is the second graduations category.

Figure 7:
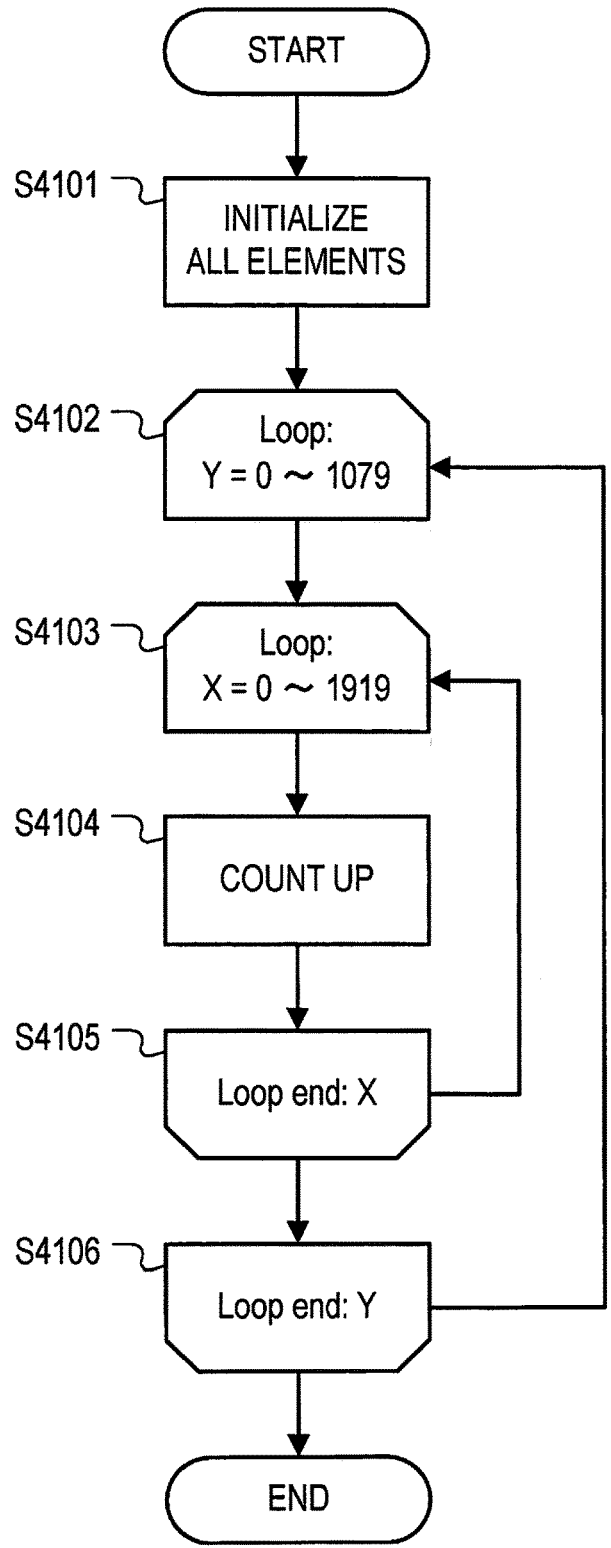
FIG. 7 is a flowchart illustrating an example of a processing flow of a histogram-generating unit according to the first embodiment.

FIG. 7 is a flowchart illustrating an example of a processing flow of the histogram-generating unit 410. First, in S4101, the histogram-generating unit 410 initializes the values of all elements HstO( ) of the original histogram 411 to 0. Subsequently, in S4102, the value of the loop variable Y is selected. The loop variable Y is used as the vertical position Y. The process of S4102 is a process of a loop starting end of the loop variable Y. In the present embodiment, the histogram-generating unit 410 sequentially selects the values 0 to 1079 as the loop variable Y. Subsequently, in S4103, the histogram-generating unit 410 selects the value of the loop variable X. The loop variable X is used as the horizontal position X and the category X. The process of S4103 is a process of a loop starting end of the loop variable X. In the present embodiment, the histogram-generating unit 410 sequentially selects the values 0 to 1919 as the loop variable X.

In S4104, the histogram-generating unit 410 counts up the frequency of the original histogram 411. That is, the histogram-generating unit 410 counts up the value of the element HstO( ) Specifically, the histogram-generating unit 410 increments the value of the element HstO(X, int(P(X, Y)/4)) of the original histogram 411 by 1. Here, int( ) is a function that outputs an integer value of the value in the parentheses.

Subsequently, the process of S4105 is performed. The process of S4105 is a process of a loop terminating end of the loop variable X. In S4105, the histogram-generating unit 410 determines whether a loop variable X which is not selected as the loop variable X corresponding to the loop variable Y selected in S4102 is present. In a case where a non-selected loop variable X is present, the flow returns to the process of S4103. The processes of S4103 to S4105 are repeated until all loop variables X are selected, and the flow proceeds to S4106 after all loop variables X are selected.

The process of S4106 is a process of a loop terminating end of the loop variable Y. In S4106, the histogram-generating unit 410 determines whether a non-selected loop variable Y is present. In a case where a non-selected loop variable Y is present, the flow returns to the process of S4102. The processes of S4102 to S4106 are repeated until all loop variables Y are selected, and this flow ends after all loop variables Y are selected.

The histogram-converting unit 420 generates waveform information by converting the data category of the original histogram 411 to the first graduations category based on the drawing characteristic information and the axial characteristic information 31. Specifically, the histogram-converting unit 420 generates the first waveform information 41 and the second waveform information 42 by converting the data category of the original histogram 411 to the first graduations category based on the first drawing characteristic information, the second drawing characteristic information, and the axial characteristic information 31.

Figure 8:
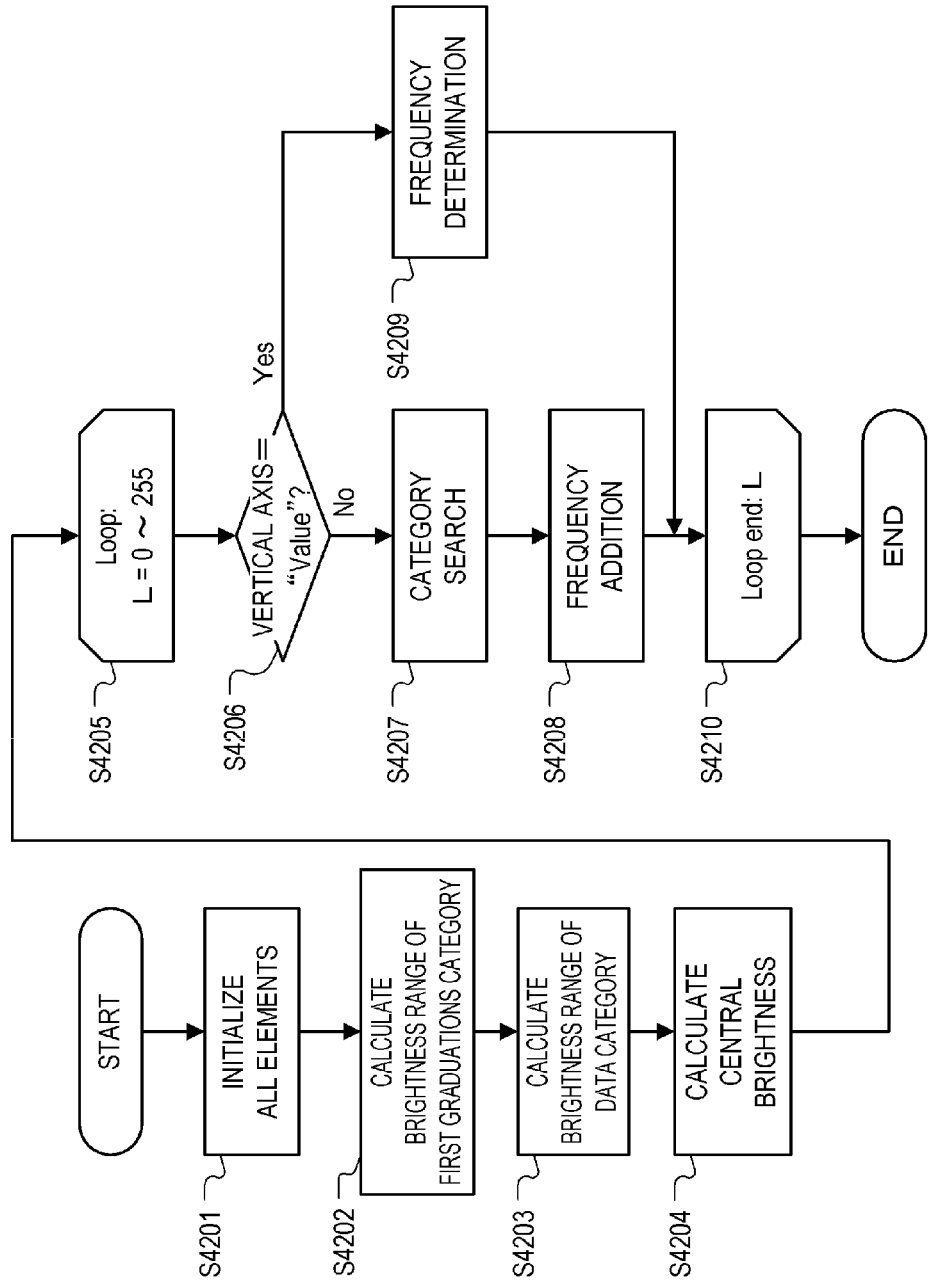
FIG. 8 is a flowchart illustrating an example of a processing flow of a histogram-converting unit according to the first embodiment.

FIG. 8 is a flowchart illustrating an example of a processing flow of the histogram-converting unit 420. First, in S4201, the histogram-generating unit 410 initializes the values of all HstA( ) of the first waveform information 41 to 0 and initializes the values of all elements HstB( ) of the second waveform information 42 to 0.

Subsequently, in S4202, the histogram-converting unit 420 determines (calculates) a plurality of brightness ranges corresponding to a plurality of first graduations categories based on the axial characteristic information 31. The brightness range corresponding to the first graduations category is used in common between the first waveform information 41 and the second waveform information 42.

Figure 9:
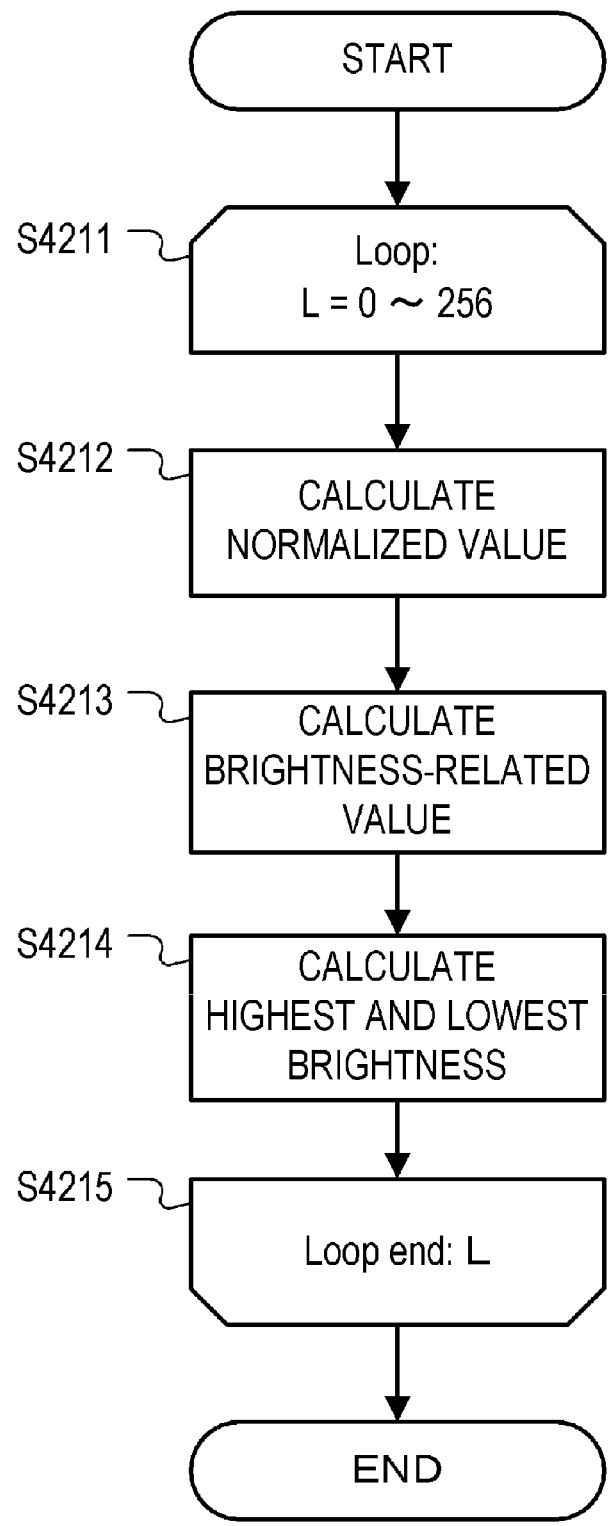
FIG. 9 is a flowchart illustrating an example of a processing flow of S4202 in FIG. 8.

FIG. 9 is a flowchart illustrating an example of a processing flow of S4202. First, S4211, the histogram-converting unit 420 selects the value of the loop variable L. The loop variable L is used as the first graduations category L. The process of S4211 is a process of a loop starting end of the loop variable L. In the pre sent embodiment, the histogram-converting unit 420 sequentially selects the values 0 to 256 as the loop variable L. Here, the reason why "256" is used as the maximum value of the loop variable L instead of "255" is because the result of processing performed using the loop variable L=256 is required to obtain the highest brightness of the brightness range corresponding to the first graduations category L=255.

Subsequently, in S4212, the histogram-converting unit 420 calculates a normalized value CatOut.N(L) by normalizing the loop variable (first graduations category) L so that the maximum value becomes 1. As described above, the maximum value of the loop variable L is "256". Therefore, the normalized value CatOut.N(L) is calculated using Expression 1 below.

$$CatOut.N(L)=L/256 \quad \text{(Expression 1)}$$

In S4213, the histogram-converting unit 420 calculates a brightness-related value CatOut.D(L) corresponding to the normalized value CatOut.N(L) based on the normalized value CatOut.N(L). A calculation formula of the brightness-related value CatOut.D(L) is determined in advance for each of a plurality of axial characteristics. An example of the calculation formula of the brightness-related value CatOut.D(L) will be described below.

In a case of axial characteristic information 31=0 (FIG. 3A: Liner):

$$CatOut.D(L)=CatOut.N(L)\times 1000 \quad \text{(Expression 2-1)}$$

In a case of axial characteristic information 31=1 (FIG. 3B: γ2.2):

$$CatOut.D(L)=(CatOut.N(L)\times 4)^{2.2}\times 100 \quad \text{(Expression 2-2)}$$

In a case of axial characteristic information 31=2 (FIG. 3C: γ2.4):

$$CatOut.D(L)=(CatOut.N(L)\times 4)^{2.4}\times 100 \quad \text{(Expression 2-3)}$$

In a case of axial characteristic information 31=3 (FIG. 3D: γ2.6):

$$CatOut.D(L)=(CatOut.N(L)\times 4)^{2.6}\times 100 \quad \text{(Expression 2-4)}$$

In a case of axial characteristic information 31=4 (FIG. 3E: dB):

$$CatOut.D(L)=CatOut.N(L)\times 40-20 \quad \text{(Expression 2-5)}$$

In a case of axial characteristic information 31=5 (FIG. 3F: Value):

$$CatOut.D(L)=CatOut.N(L)\times 1024 \quad \text{(Expression 2-6)}$$

The constants used in Expressions 2-1 to 2-6 are preferably determined so that one, of which the brightness-related value relates to a predetermined brightness such as the first reference brightness or the second reference brightness, of the graduations of is arranged at a predetermined position of the vertical axis. By doing so, the user can easily understand the position of one, which corresponds to the predetermined brightness, the graduations regardless of the used axial characteristic. In the examples of FIGS. 3B to 3D, the brightness-related value 100% is positioned at a position approximately ¼ of the entire length of the vertical axis above from the lower end of the vertical axis. Therefore, in a case where the vertical axes of FIGS. 3B to 3D are used, the user can easily understand the position of the brightness-related value 100%.

The constants used in Expressions 2-1 to 2-6 may be changed according to the usage of the waveform information, the usage of the waveform image, the type of the input image data 1, the operation mode of the image display apparatus, the use environment of the image display apparatus, and the like. The constants used in Expressions 2-1 to 2-6 may be designated by the user. Moreover, the calculation result of the brightness-related value CatOut.D(L) corresponding to the normalized value CatOut.N(L) may be recorded in advance in a storage unit (ROM or the like). Moreover, the calculation result may be acquired from a storage unit rather than performing calculation using the calculation formulas.

Subsequently, in S4214, the histogram-converting unit 420 calculates a highest brightness CatOut.Hi(L-1) and a lowest brightness CatOut.Lo(L) based on the brightness-related value CatOut.D(L). The highest brightness CatOut.Hi (L-1) is the highest brightness of the brightness range corresponding to the first graduations category L-1, and the lowest brightness CatOut.Lo(L) is the lowest brightness of the brightness range corresponding to the first graduations category L. In the present embodiment, the highest brightness CatOut.Hi(L-1) and the lowest brightness CatOut.Lo(L) are calculated using Expressions 3-1 and 3-2 below. However, calculation of CatOut.Hi(L-1) is omitted in a case of the loop variable L=0, and calculation CatOut.Lo (L) is omitted in a case of the loop variable L=256. The brightness related to the brightness-related value CatOut.D (L) is obtained using a function or a table indicating the correspondence relation between the brightness-related value CatOut.D(L) and the brightness.

$$CatOut.Hi(L-1)=\text{Brightness related to } CatOut.D(L) \quad \text{(Expression 3-1)}$$

$$CatOut.Lo(L)=\text{Brightness related to } CatOut.D(L) \quad \text{(Expression 3-2)}$$

In S4214, the percentage (%) of the brightness to the first reference brightness may be used as the "brightness". In a case where the percentage (%) of the brightness to the first reference brightness is used as the "brightness", the "CatOut.D(L)" can be used as the "brightness related to CatOut.D(L)" in a case of the axial characteristic information 31=0 to 4.

Subsequently, the process of S4215 is performed. The process of S4215 is a process of a loop terminating end of the loop variable L. In S4215, the histogram-converting unit 420 determines whether a non-selected loop variable L is present. In a case where a non-selected loop variable L is present, the flow returns to the process of S4211. The processes of S4211 to S4215 are repeated until all loop variables L are selected, and this flow (the process of S4202) ends after all loop variables L are selected. After that, the flow proceeds to S4203 in FIG. 8.

FIG. 8 will be described. In S4203, the histogram-converting unit 420 determines a first corresponding brightness based on the first drawing characteristic information 21. The first corresponding brightness is a brightness corresponding to the data value that the input image data 1 can take and a brightness in a case where the EOTF related to the first drawing characteristic information 21 is used. Specifically, the histogram-converting unit 420 determines a plurality of first brightness ranges corresponding to the plurality of data categories of the original histogram 411. The first brightness range is the range of the first corresponding brightness. The processing method of S4203 is approximately the same as the processing method of S4202.

Specifically, a loop process of repeating the following processes while sequentially changing the loop variable L from 0 to 256 is performed. First, a normalized value CatInA.N(L)=L/256 is calculated. Subsequently, a brightness-related value CatInA.D(L) corresponding to the normalized value CatInA.N(L) is calculated based on the normalized value CatInA.N(L). Moreover, a highest brightness CatInA.Hi(L-1) and a lowest brightness CatInA.Lo(L) are calculated based on the brightness-related value CatInA.D (L). However, calculation of CatInA.Hi(L-1) is omitted in a case of the loop variable L=0, and calculation of CatInA.Lo (L) is omitted in a case of the loop variable L=256. The highest brightness CatInA.Hi(L-1) is the highest brightness of the first brightness range corresponding to the data category L-1, and the lowest brightness CatInA.Lo(L) is the lowest brightness of the first brightness range corresponding to the data category L.

An example of a calculation formula of the brightness-related value CatInA.D(L) is illustrated below. In calculation of the brightness-related value CatInA.D(L), a calculation formula based on the definition of the EOTF corresponding to the first drawing characteristic information 21 may be used and a calculation formula obtained by changing the calculation formula based on the definition of the EOTF may be used. For example, an adjustment factor such as a gain adjustment may be applied to the calculation formula based on the definition of the EOTF.

In a case of first drawing characteristic information 21=1 (γ2.2):

$$\text{CatIn}A.D(L)=\text{CatIn}A.N(L)^{2.2}\times 100 \quad \text{(Expression 4-1)}$$

In a case of first drawing characteristic information 21=2 (γ2.4):

$$\text{CatIn}A.D(L)=\text{CatIn}A.N(L)^{2.4}\times 100 \quad \text{(Expression 4-2)}$$

In a case of first drawing characteristic information 21=3 (γ2.6):

$$\text{CatIn}A.D(L)=\text{CatIn}A.N(L)^{2.6}\times 100 \quad \text{(Expression 4-3)}$$

In a case of first drawing characteristic information 21=4(Standard A):Calculation formula corresponding to Standard A  (Expression 4-4)

In a case of first drawing characteristic information 21=5(Standard B):Calculation formula corresponding to Standard B  (Expression 4-5)

An example of the calculation formulas of the highest brightness CatInA.Hi (L-1) and the lowest brightness CatInA.Lo (L) is illustrated below.

$$\text{CatIn}A.\text{Hi}(L\text{-}1)=\text{Brightness related to CatIn}A.D(L) \quad \text{(Expression 5-1)}$$

$$\text{CatIn}A.\text{Lo}(L)=\text{Brightness related to CatIn}A.D(L) \quad \text{(Expression 5-2)}$$

Similarly, the histogram-converting unit 420 determines a second corresponding brightness based on the second drawing characteristic information 22. The second corresponding brightness is a brightness corresponding to the data value that the input image data 1 can take and is a brightness in a case where the EOTF related to the second drawing characteristic information 22 is used. Specifically, the histogram-converting unit 420 determines a plurality of second brightness ranges corresponding to the plurality of data categories of the original histogram 411. The second brightness range is the range of the second corresponding brightness.

By subsequent processes, the data category of the original histogram 411 is converted to the first graduations category based on the determination result of the corresponding brightness and the axial characteristic information 31 (the processing result in S4202).

First, S4204, the histogram-converting unit 420 calculates a central brightness of each of the first brightness ranges and a central brightness of each of the second brightness ranges. In the present embodiment, the central brightness CatInA.Mid(L) of the first brightness range corresponding to the data category L and the central brightness CatInB.Mid(L) of the second brightness range corresponding to the data category L using Expressions 6-1 and 6-2 below. In Expressions 6-1 and 6-2, "CatInA.Hi(L)" is the highest brightness of the first brightness range corresponding to the data category L, and "CatInA.Lo(L)" is the lowest brightness of the first brightness range corresponding to the data category L. Moreover, "CatInB.Hi(L)" is the highest brightness of the second brightness range corresponding to the data category L, and "CatInB.Lo(L)" is the lowest brightness of the second brightness range corresponding to the data category L.

$$\text{CatIn}A.\text{Mid}(L)=(\text{CatIn}A.\text{Hi}(L)+\text{CatIn}A.\text{Lo}(L))/2 \quad \text{(Expression 6-1)}$$

$$\text{CatIn}B.\text{Mid}(L)=(\text{CatIn}B.\text{Hi}(L)+\text{CatIn}B.\text{Lo}(L))/2 \quad \text{(Expression 6-2)}$$

Subsequently, in S4205, the histogram-converting unit 420 selects the value of the loop variable L. The loop variable L is used as the data category L. The process of S4205 is a process of a loop starting end of the loop variable L. In the present embodiment, the histogram-converting unit 420 sequentially selects the values 0 to 255 as the loop variable L.

In S4206, the histogram-converting unit 420 determines whether the axial characteristic information 31=5 (Value). The flow proceeds to S4209 in a case of the axial characteristic information 31=5, and the flow proceeds to S4207 in a case of the axial characteristic information 31≠5.

In S4207, the histogram-converting unit 420 determines the first graduations category having the brightness range to which the central brightness CatInA.Mid(L) of the first brightness range and the central brightness CatInB.Mid(L) of the second brightness range belong (this determination is referred to as category search). The brightness range of the first graduations category L is a range between the lowest brightness CatOut.Lo(L) and the highest brightness CatOut.Hi(L). In S4207, the first graduations category having the brightness range to which the central brightness CatInA.Mid (L) belongs is determined by comparing the processing result in S4207 with the central brightness CatInA.Mid(L) of the first brightness range. Moreover, the first graduations category having the brightness range to which the central brightness CatInB.Mid(L) is determined by comparing the processing result in S4207 and the central brightness CatInB.Mid(L) of the second brightness range.

Here, a case in which the value of the central brightness CatInA.Mid(L) is 2.3 and the processing result in S4202 is the result illustrated in FIG. 10 will be considered. The brightness range of the first graduations category 11 is the range between 2.077151 and 2.515375. Therefore, it is determined that "the central brightness CatInA.Mid(L) belongs to the brightness range of the first graduations category 11". By the same method, the first graduations category having the brightness range to which the central brightness CatInB.Mid(L) belongs is determined. After that, the first graduations category corresponding to the brightness range including the central brightness CatInA.Mid(L) will be referred to as a "destination category FLA", and the first graduations category corresponding to the brightness range including the central brightness CatInB.Mid(L) will be referred to as a "destination category FLB".

Subsequently to S4207, the process of S4208 is performed. In S4208, the histogram-converting unit 420 corrects the value (number of pixels) of the element HstA(X, FLA) of the first waveform information 41 and the element HstB(X, FLB) of the second waveform information 42 based on the processing result in S4207 (this correction is referred to as frequency addition). In the present embodiment, the elements HstA(X, FLA) and HstB(X, FLB) are corrected using Expressions 7-1 and 7-2 below. The process of S4208 is performed for all elements HstO(X, L) corresponding to the loop variable (data category) L. After that, the flow proceeds to S4210.

$$HstA(X,FLA)=HstA(X,FLA)+HstO(X,L) \quad \text{(Expression 7-1)}$$

$$HstB(X,FLB)=HstB(X,FLB)+HstO(X,L) \quad \text{(Expression 7-2)}$$

By the process of S4208, the data category L is converted to the first graduations category FLA and FLB. Although an example of performing a simple addition process is described in the present embodiment, the present invention is not limited to this. For example, the above-described addition process may be performed while performing a filtering process for improving a waveform display quality on the elements HstA(X, FLA), HstB(X, FLB), HstO(X, L), and the like.

In S4209, the histogram-converting unit 420 determines the value (number of pixels) of the element HstA(X, FLA) of the first waveform information 41 (this determination is referred to as frequency determination). In a case of the axial characteristic information 31=5 (Value), the first graduations category is identical to the data category. Due to this, as illustrated in Expression 8 below, the element HstO(X, L) of the original histogram 411 is determined as the element HstA(X, FLA) of the first waveform information 41. Moreover, since the relevance between the first waveform information 41 and the second waveform information 42 disappears, generation of the second waveform information 42 is disabled. The process of S4209 is performed for all elements HstO(X, L) corresponding to the loop variable (the data category) L. After that, the flow proceeds to S4210.

$$HstA(L)=HstO(L) \quad \text{(Expression 8)}$$

The process of S4210 is a process of a loop terminating end of the loop variable L. In S4210, the histogram-converting unit 420 determines whether a non-selected loop variable L is present. In a case where a non-selected loop variable L is present, the flow returns to the process of S4205. The processes of S4205 to 4210 are repeated until all loop variables L are selected, and this flow ends after all loop variables L are selected.

Figure 11:
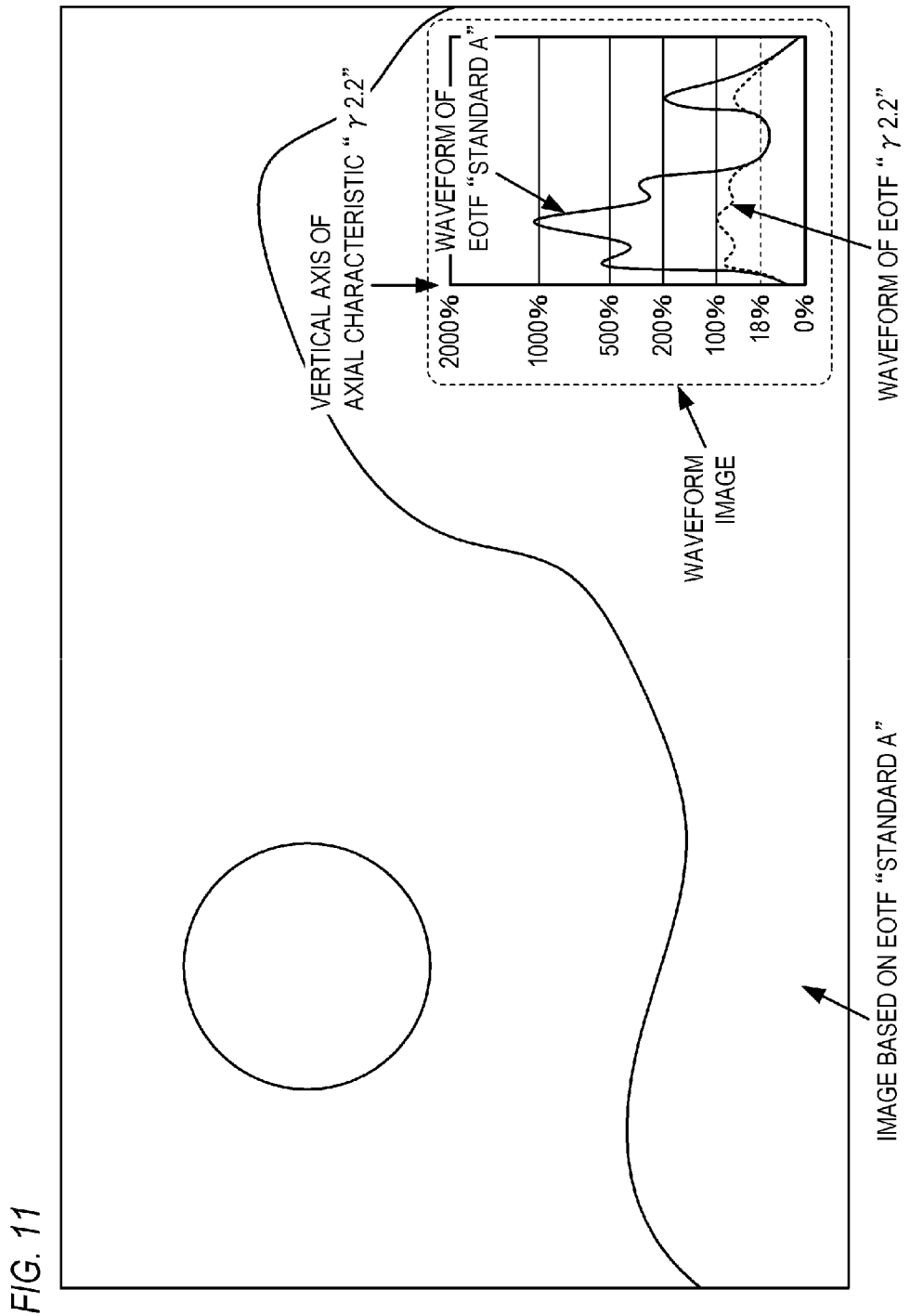
FIG. 11 is a diagram illustrating an example of a display image according to the first embodiment.

Next, a specific example of an operation of the image display apparatus according to the present embodiment will be described. FIG. 11 is a diagram illustrating an example of a display image (an image displayed on a screen) according to the present embodiment. Here, the EOTF "Standard A" is assumed to be used in the input image data 1. This EOTF is referred to as "hybrid-γ". The hybrid-γ supports HDR display (display in a high dynamic range (HDR)). The HDR is a dynamic range wider than SDR. Furthermore, the hybrid-γ has such a characteristic that a satisfactory image can be displayed even when the EOTF "γ2.2" is used. Due to this, a user who edits images observes and compares a plurality of waveforms as the waveform of the input image data 1 simultaneously. Specifically, a waveform corresponding to a HDR monitor (a monitor that displays images in HDR) and a waveform corresponding to a γ2.2 monitor (a monitor that displays images using EOTF "γ2.2") are simultaneously observed and compared. Due to this, in the present embodiment, as illustrated in FIG. 11, a waveform corresponding to the case where "Standard A" is used as the EOTF of the input image data 1 and a waveform corresponding to the case where "γ2.2" is used as the EOTF of the input image data 1 are displayed simultaneously.

Metadata indicating the EOTF "Standard A" is added to the input image data 1, and information on the EOTF "Standard A" is obtained as the input characteristic information 11 by the EOTF-acquiring unit 10. In a case where the user selects a first EOTF "Automatic" and a second EOTF "γ2.2", the EOTF-setting unit 20 acquires information on the EOTF "Standard A" as the first drawing characteristic information 21 and acquires information on the EOTF "γ2.2" as the second drawing characteristic information 22. In a case where the user selects the axial characteristic "γ2.2", the axis-setting unit 30 acquires information on the axial characteristic "γ2.2" as the axial characteristic information 31.

In the histogram-generating unit 410, the original histogram 411 which is a two-dimensional histogram is generated by analysis of the input image data 1. In the histogram-converting unit 420, first, a plurality of brightness ranges corresponding to a plurality of first graduations categories are calculated. In this example, the result illustrated in FIG. 10 is obtained as the calculation result of the brightness range. In FIG. 10, the percentage (%) of brightness to the first reference brightness is used as the brightness. In the axial characteristic "γ2.2", the brightness 100% is positioned at a position approximately ¼ of the entire length of the vertical axis above from the lower end of the vertical axis. The brightness of 0% to 2111% can be plotted in the entire vertical axis. That is, the range of the first graduations category from 0 to 255 corresponds to the brightness range from 0% to 2111%.

In the image data in which HDR is assumed to be used, a data value exceeding the brightness 100% is defined. A value in the range of approximately 1000% to approximately 2000% is often defined as an upper limit brightness. Thus, a range up to approximately 2000% is required for displaying waveforms. Since the brightness up to 2111% can be plotted using the axial characteristic "γ2.2", the brightness of HDR can be plotted without any problem. Moreover, the axial characteristic "γ2.2" has the same characteristic in the brightness range of 0% to 100% as the entire vertical axis of the conventional waveform display in which the EOTF "γ2.2" is assumed to be used. Due to this, by virtue of using the axial characteristic "γ2.2", the user can observe the waveform of SDR and the waveform of HDR without any discomfort.

In the histogram-converting unit 420, a plurality of first brightness ranges corresponding to the plurality of data categories of the original histogram. 411 are calculated based on the first drawing characteristic information 21 (EOTF "Standard A"). In this example, the result illustrated in FIG. 12A is obtained as the calculation result of the first brightness range. In FIG. 12A, the percentage (%) of brightness to the first reference brightness is used as the brightness. In the EOTF "Standard A", 1200% is defined as the upper limit brightness. From FIG. 12A, it can be understood that the intervals between the plurality of data categories are equal whereas the intervals between the plurality of lowest brightness values of the plurality of first brightness ranges, the plurality of highest brightness values of the plurality of first brightness ranges, and the plurality of central brightness values of the plurality of first brightness ranges are not equal. In other words, it can be understood that the width of the data category is constant (1), whereby the width of the first brightness range is not constant.

In the histogram-converting unit 420, the first graduations category FLA corresponding to the central brightness of the first brightness range is detected for each of the plurality of first brightness ranges. The frequency of the original histogram 411 is redistributed to the first waveform information 41 according to the detection result of FLA. Since 1200% is defined as the upper limit brightness in the EOTF "Standard A", the frequencies of the data categories 0 to 255 are redistributed to the first graduations categories 0 to 197.

Similarly, in the histogram-converting unit 420, a plurality of second brightness ranges corresponding to the plurality of data categories of the original histogram 411 are calculated based on the second drawing characteristic information 22 (EOTF "γ2.2"). In this example, the result illustrated in FIG. 12B is obtained as the calculation result of the second brightness range. In FIG. 12B, the percentage (%) of brightness to the first reference brightness is used as the brightness. In the histogram-converting unit 420, the frequency of the original histogram 411 is redistributed to the second waveform information 42. Since 100% is defined as the upper limit brightness in the EOTF "γ2.2", the frequencies of the data categories 0 to 255 are redistributed to the first graduations categories 0 to 63.

With the above-described redistribution, it is possible to obtain the same processing result as the result of a process of converting the input image data 1 based on the EOTF related to the drawing characteristic information and acquiring the histogram corresponding to the axial characteristic of the axial characteristic information 31 from the image data after conversion. Here, a case of obtaining a plurality of histograms corresponding to a plurality of EOTFs from one image will be considered. In the present embodiment, it is possible to obtain the plurality of histograms just by performing a process of generating a histogram from input image once. Due to this, it is possible to reduce the scale of the hardware necessary for acquiring the plurality of histograms and to accelerate the response speed for acquiring the waveform information and displaying the waveform image.

As described above, according to the present embodiment, the gradation characteristic information and the axial characteristic information are acquired. Moreover, distribution information which indicates a distribution of the brightness-related value related to the brightness of the input image data in a case where the gradation characteristic related to the gradation characteristic information is used as the gradation characteristic of the input image data using the first axis having the axial characteristic related to the axial characteristic information is generated. In this way, it is possible to improve the convenience with which information indicating the brightness distribution of image data is used. For example, it is possible to obtain the distribution information indicating the distribution of the brightness-related value using an axis preferred by the user, an axis familiar with the user, and the like as the first axis and to display a distribution image based on the distribution information. As a result, the user can determine the brightness distribution (the distribution of the brightness-related value) of the image data with high accuracy. According to the present embodiment, the first axis used to indicate the distribution of the brightness-related value is common among the plurality of distribution information corresponding to the plurality of gradation characteristics. Due to this, the user can compare the plurality of distribution information with high accuracy.

Although an example in which the distribution image is generated and displayed based on the distribution information has been described in the present embodiment, the usage of the distribution information is not limited to this. For example, the distribution information may be recorded in a storage unit rather than performing such a process.

Second Embodiment

Hereinafter, a second embodiment of the present invention will be described. In the present embodiment, the same processing result as the first embodiment can be obtained by a configuration and a process different from that of the first embodiment. In the present embodiment, the distribution information is acquired in a time-sharing manner while changing the settings for acquisition. In the following description, the configuration and the process different from those of the first embodiment will be described in detail and the description of the same configuration and process as those of the first embodiment will be omitted.

FIG. 13 is a block diagram illustrating an example of a functional configuration of the waveform-information-generating unit 400 according to the present embodiment. As illustrated in FIG. 13, the waveform-information-generating unit 400 includes a histogram-setting-generating unit 430, a histogram-generating unit 410, and a histogram-setting unit 440.

The histogram-setting-generating unit 430 determines a first graduations category corresponding to the data value that the input image data 1 can take based on the drawing characteristic information and the axial characteristic information 31. Moreover, the histogram-setting-generating unit 430 outputs the determination result (the histogram setting table 431) of the first graduations category. In the present embodiment, the histogram-setting-generating unit 430 sequentially selects the first drawing characteristic information 21 and the second drawing characteristic information 22 and performs the above-described process using the selected information. FIG. 14 illustrates a data structure of the histogram setting table 431. In FIG. 14, "FL" is the first graduations category (the value (number) of the first graduations category), "CatP.Lo" is the minimum value of the data category corresponding to the first graduations category FL, and "CatP.Hi" is the maximum value of the data category corresponding to the first graduations category FL. The data structure of the histogram setting table 431 is not limited to the data structure illustrated in FIG. 14. For example, the range of the data value may be used instead of the category range (the range between the minimum value CatP.Lo and the maximum value CatP.Hi). The determination result of the first graduations category may be a function rather than a table.

A method of determining the first graduations category corresponding to the data value that the input image data 1 can take is not particularly limited. However, in the present embodiment, first, the histogram-setting-generating unit 430 determines a corresponding brightness. The histogram-setting-generating unit 430 determines the first graduations category corresponding to the data value that the input image data 1 can take based on the determination result of the corresponding brightness and the axial characteristic information 3*l*. Hereinafter, the process of the histogram-setting-generating unit 430 will be described in detail.

First, the histogram-setting-generating unit 430 determines the brightness range of each of the first graduations categories, the central brightness of each of the first brightness range, and the destination category of each data category by the same method as the processing method of the histogram-converting unit 420 according to the first embodiment. The histogram-setting-generating unit 430 determines the range of the data category corresponding to the first graduations category for each of the plurality of first graduations categories using these determined information. Specifically, the range of the data category L having the same destination category FLA is determined as the range of the data category corresponding to the first graduations category FL=FLA. For example, in a case where the information illustrated in FIG. 12A is obtained, the data categories L=0 to 3 corresponds to the destination category FLA=0. Due to this, CatP.Lo=0 and CatP.Hi=3 are corresponded to the first graduations category FL=0. The data category L corresponding to the destination category FLA 198 is not present. Due to this, CatP.Lo=256 and CatP.Hi=256 are corresponded to the first graduations category FL 198. FIG. 14 illustrates a histogram setting table 431 in a case where the information illustrated in FIG. 12A is obtained.

The information on the first graduations category FL of which the corresponding data category L is not present may not be included in the histogram setting table 431. That is, in a case where the information illustrated in FIG. 12A is obtained, the information of the first graduations category FL 198 may not be included in the histogram setting table 431.

The process is a process in a case where the first drawing characteristic information 21 is selected. In a case where the second drawing characteristic information 22 is selected, the central brightness of each of the second brightness ranges is used instead of the central brightness of each of the first brightness ranges.

The histogram-generating unit 410 generates the original histogram 411 based on the histogram setting table 431 (the determination result of the first graduations category) and the input image data 1. A method of generating the original histogram 411 is approximately the same as the method of the first embodiment (FIG. 7). However, in the present embodiment, a process different from that of the first embodiment is performed as the process of S4104 in FIG. 7. In the present embodiment, in S4104, the histogram-generating unit 410 detects the first graduations category FL corresponding to the category range (the range between the minimum value CatP.Lo and the maximum value CatP.Hi) including int (P (X, Y)/4). Moreover, the histogram-generating unit 410 increments the value of the element HstO(X, detected FL) of the original histogram 411 by 1. By this process, the same value as the value after redistribution described in the first embodiment can be obtained as the value (the number of pixels) of the element HstO( ). Therefore, the histogram of the first graduations category obtained by converting the data value of the input image data 1 can be obtained as the original histogram 411. That is, the same waveform information as the waveform information obtained by the histogram-converting unit 420 according to the first embodiment can be obtained as the original histogram 411.

The histogram-setting unit 440 sets the original histogram 411 as the first waveform information 41 or the second waveform information 42. For example, the histogram-setting unit 440 sets the original histogram 411 as the first waveform information 41 or the second waveform information 42 according to an instruction from a control unit (not illustrated). In a case where the first drawing characteristic information 21 is selected by the histogram-setting-generating unit 430, the original histogram 411 is set as the first waveform information 41. In a case where the second drawing characteristic information 22 is selected, the original histogram 411 is set as the second waveform information 42.

An example of a processing flow of the waveform-information-generating unit 400 according to the present embodiment will be described. First, the histogram-setting-generating unit 430 generates the histogram setting table 431 based on the first drawing characteristic information 21 and the axial characteristic information 31 (process 2-1). Subsequently, the histogram-generating unit 410 generates the original histogram 411 by analyzing the input image data 1 based on the histogram setting table 431 generated by process 2-1 (process 2-2). Moreover, the histogram-setting unit 440 sets the original histogram 411 generated by process 2-2 as the first waveform information 41 (process 2-3). Subsequently, the histogram-setting-generating unit 430 generates the histogram setting table 431 based on the second drawing characteristic information 22 and the axial characteristic information 31 (process 2-4). Subsequently, the histogram-generating unit 410 generates the original histogram 411 by analyzing the input image data 1 based on the histogram setting table 431 generated by process 2-4 (process 2-5). Moreover, the histogram-setting unit 440 sets the original histogram 411 generated by process 2-5 as the first waveform information (process 2-6).

As described above, in the present embodiment, it is possible to obtain the same distribution information as the distribution information according to the first embodiment. As a result, it is possible to improve the convenience with which the information indicating the brightness distribution of the image data is used. Moreover, according to the present embodiment, a plurality of distribution information are generated by using the histogram-generating unit in a time-sharing manner. As a result, it is possible to reduce the scale of the hardware. A plurality of distribution information may be generated in parallel using a plurality of histogram-generating units. For example, generation of the first waveform information and generation of the second waveform information may be performed in parallel using two histogram-generating units. As a result, it is possible to accelerate the response speed for acquiring the distribution information and displaying the distribution image.

Third Embodiment

Hereinafter, a third embodiment of the present invention will be described. In the present embodiment, the same processing result as the first embodiment can be obtained by a configuration and a process different from that of the first embodiment. In the present embodiment, a process of adapting the gradation characteristic of input image data to the axial characteristic of the vertical axis and acquiring the histogram of the image data after adaptation is performed in a time-sharing manner. In the following description, the configuration and the process different from those of the first embodiment will be described in detail and the description of the same configuration and process as those of the first embodiment will be omitted.

FIG. 15 is a block diagram illustrating an example of a functional configuration of the waveform-information-generating unit 400 according to the present embodiment. As illustrated in FIG. 15, the waveform-information-generating unit 400 includes a conversion-table-generating unit 450, a gradation-converting unit 460, a histogram-generating unit 410, and a histogram-setting unit 440.

The conversion-table-generating unit 450 determines a first graduations category corresponding to the data value that the input image data 1 can take based on the drawing characteristic information and the axial characteristic information 31. The conversion-table-generating unit 450 outputs the determination result (a gradation conversion table 451) of the first graduations category. In the embodiment, the histogram-setting-generating unit 430 sequentially selects the first drawing characteristic information 21 and the second drawing characteristic information 22 and performs the above-described process using the selected information. FIG. 16 illustrates a data structure of the gradation conversion table 451. As illustrated in FIG. 16, in the present embodiment, a table indicating the correspondence relation between the data category L and the first graduations category (destination category) FLA is generated as the gradation conversion table 451. The data structure of the gradation conversion table 451 is not limited to the data structure illustrated in FIG. 16. A data value may be used instead of the data category L. The determination result of the first graduations category may be a function rather than the table.

In the present embodiment, first, the conversion-table-generating unit 450 determines the brightness range of the first graduations category, the central brightness of each of the first brightness ranges, and the destination category of each data category by the same method as the processing method of the histogram-converting unit 420 according to the first embodiment. The conversion-table-generating unit 450 generates the gradation conversion table 451 illustrated in FIG. 16 using these determined information. For example, the gradation conversion table 451 illustrated in FIG. 16 is generated by extracting the information on the data category L and the information on the destination category FLA from the information illustrated in FIG. 12A.

The gradation-converting unit 460 generates converted image data 461 by converting the data value of the input image data 1 to the first graduations category based on the gradation conversion table 451 (the determination result of the first graduations category). In the present embodiment, a data value P (X, Y) of the input image data 1 is converted to a data value P' (X, Y) of the converted image data 461 using Expression 9 below. In Expression 9, "FLA (int (P(X, Y)/4))" is the first graduations category FLA corresponding to the data category L=int (P(X, Y)/4) in the gradation conversion table 451.

$$P'(X,Y)=FLA(\text{int}(P(X,Y)/4)) \quad \text{(Expression 9)}$$

The histogram-generating unit 410 generates a histogram of the data value of the converted image data 461 based on the converted image data 461 as the original histogram 411. Since the data value of the converted image data 461 is the first graduations category, it is possible to obtain the same waveform information as the waveform information obtained by the histogram-converting unit 420 according to the first embodiment as the original histogram 411. A method of generating the original histogram 411 is the same as the method according to the first embodiment (FIG. 7). The histogram-setting unit 440 performs the same process as the second embodiment. Specifically, in a case where the first drawing characteristic information 21 is selected by the conversion-table-generating unit 450, the histogram-setting unit 440 sets the original histogram 411 as the first waveform information 41. In a case where the second drawing characteristic information 22 is selected, the histogram-setting unit 440 sets the original histogram 411 as the second waveform information 42.

An example of a processing flow of the waveform-information-generating unit 400 according to the present embodiment will be described. First, the conversion-table-generating unit 450 generates the gradation conversion table 451 based on the first drawing characteristic information 21 and the axial characteristic information 31 (process 3-1). Subsequently, the gradation-converting unit 460 converts the input image data 1 to the converted image data 461 based on the gradation conversion table 451 generated by process 3-1 (process 3-2). The histogram-generating unit 410 generates the original histogram 411 by analyzing the converted image data 461 generated by process 3-2 (process 3-3). Subsequently, the histogram-setting unit 440 sets the original histogram 411 generated by process 3-3 as the first waveform information (process 3-4).

The conversion-table-generating unit 450 generates the gradation conversion table 451 based on the second drawing characteristic information 22 and the axial characteristic information 31 (process 3-5). Subsequently, the gradation-converting unit 460 converts the input image data 1 to the converted image data 461 based on the gradation conversion table 451 generated by process 3-5 (process 3-6). Moreover, the histogram-generating unit 410 generates the original histogram 411 by analyzing the converted image data 461 generated by process 3-6 (process 3-7). Subsequently, the histogram-setting unit 440 sets the original histogram 411 generated by process 3-7 as the second waveform information 42 (process 3-8).

As described above, in the present embodiment, it is possible to obtain the same distribution information as the distribution information according to the first embodiment. As a result, it is possible to improve the convenience with which the information indicating the brightness distribution of the image data is used. Moreover, according to the present embodiment, a plurality of distribution information are generated by using the gradation-converting unit and the histogram-generating unit in a time-sharing manner. As a result, it is possible to reduce the scale of the hardware. A plurality of distribution information may be generated in parallel using a plurality of gradation-converting units and a plurality of histogram-generating units. As a result, it is possible to accelerate the response speed for acquiring the distribution information and displaying the distribution image.

Fourth Embodiment

Hereinafter, a fourth embodiment of the present invention will be described. In the present embodiment, an example in which a plurality of axial characteristics are selected for the vertical axis will be described. Moreover, in the present embodiment, an example in which a plurality of input image data are pre sent will be described. In the following description, the configuration and the process different from those of the first embodiment will be described in detail and the description of the same configuration and process as those of the first embodiment will be omitted.

Figure 17:
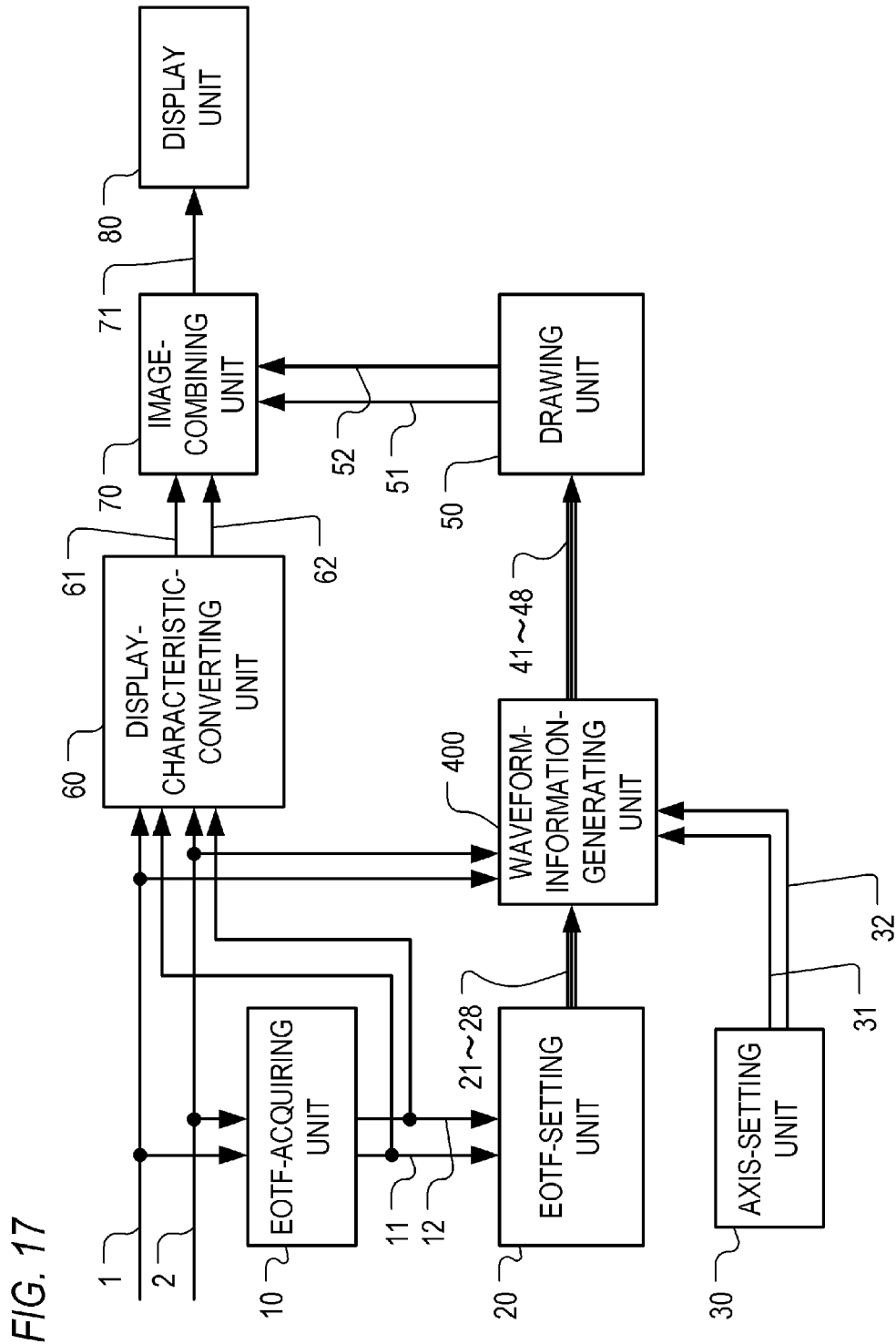
FIG. 17 is a block diagram illustrating an example of a functional configuration of an image display apparatus according to a fourth embodiment.

FIG. 17 is a block diagram illustrating an example of a functional configuration of an image display apparatus according to the present embodiment. As illustrated in FIG. 17, the image display apparatus according to the present embodiment has the same configuration as the image display apparatus (FIG. 1) according to the first embodiment. However, in the present embodiment, two input image data 1 and 2 are input to the image display apparatus. The number of input image data may be larger or smaller than 2.

Similarly to the first embodiment, the EOTF-acquiring unit 10 acquires information on the EOTF pre-associated with the input image data 1 and outputs the input characteristic information 11 corresponding to the acquired information. Furthermore, the EOTF-acquiring unit 10 acquires information on the EOTF pre-associated with the input image data 2 and outputs the input characteristic information 12 corresponding to the acquired information.

Similarly to the first embodiment, the EOTF-setting unit 20 acquires the drawing characteristic information and outputs the acquired drawing characteristic information. In the present embodiment, the drawing characteristic information is acquired for each of the two input image data 1 and 2. Moreover, in the pre sent embodiment, eight EOTFs at most are designated by the user. Specifically, four EOTFs at most are designated for each of the two input image data 1 and 2. Due to this, in the present embodiment, eight drawing characteristic information 21 to 28 are acquired. The number of types of EOTFs that can be designated for the input image data 1 may be different from the number of types of EOTFs that can be designated for the input image data 2.

Similarly to the first embodiment, the axis-setting unit 30 acquires the axial characteristic information and outputs the acquired axial characteristic information. In the present embodiment, two axial characteristics are designated (selected) by the user. Moreover, two axial characteristic information 31 and 32 corresponding to the designated two axial characteristics are acquired. The number of acquired and output axial characteristic information may be larger than 2.

The waveform-information-generating unit 400 generates the waveform information according to the same method as the first embodiment and outputs the generated waveform information. In the present embodiment, the waveform information corresponding to the axial characteristic information is generated for each of the two axial characteristic information 31 and 32. In the present embodiment, the waveform information corresponding to the input image data is generated for each of the two input image data 1 and 2. Furthermore, in the present embodiment, the waveform information corresponding to the drawing characteristic information is generated for each of the eight drawing characteristic information 21 to 28. Specifically, eight combinations are determined in advance as a combination of any one of the two axial characteristic information 31 and 32, any one of the two input image data 1 and 2, and any one of the eight drawing characteristic information 21 to 28. Moreover, eight corresponding waveform information 41 to 48 are generated for the eight combinations. The type of combination, the number of combinations, and the like are not particularly limited.

The drawing unit 50 generates the waveform image data by the same method as the first embodiment and outputs the generated waveform image data. In the present embodiment, eight waveform images corresponding to the eight waveform information 41 to 48 are drawn. In the present embodiment, two image regions corresponding to the two axial characteristic information 31 and 32 are used. The drawing unit 50 draws the waveform image based on the waveform information corresponding to the axial characteristic information 31 in the image region corresponding to the axial characteristic information 31. As a result, the waveform image data 51 indicating the waveform image drawn in the image region corresponding to the axial characteristic information 31 is generated. Moreover, the drawing unit 50 draws the waveform image based on the waveform information corresponding to the axial characteristic information 32 in an image region corresponding to the axial characteristic information 32. As a result, the waveform image data 52 indicating the waveform image drawn in the image region corresponding to the axial characteristic information 32 is generated. In the present embodiment, the two image regions are arranged in a horizontal direction (left-right direction). Specifically, the image region corresponding to the axial characteristic information 31 is arranged on the left side and the image region corresponding to the axial characteristic information 32 is arranged on the right side. The number of image regions, the arrangement of the image regions, and the like are not particularly limited. For example, the two image regions may be arranged in a vertical direction.

Similarly to the first embodiment, the display-characteristic-converting unit 60 generates the display image data 61 from the input image data 1 based on the input characteristic information 11. Furthermore, the display-characteristic-converting unit 60 generates the display image data 62 from the input image data 2 based on the input characteristic information 12. Moreover, the display-characteristic-converting unit 60 outputs the display image data 61 and 62.

The image-combining unit 70 generates the combined image data 71 by the same method as the first embodiment and outputs the generated combined image data 71. In the present embodiment, the display image data 61, the display image data 62, the waveform image data 51, and the waveform image data 52 are combined. Moreover, an image represented by the display image data 61, an image represented by the display image data 62, an image represented by the waveform image data 51, and an image represented by the waveform image data 52 are arranged in the combined image.

Figure 18A:
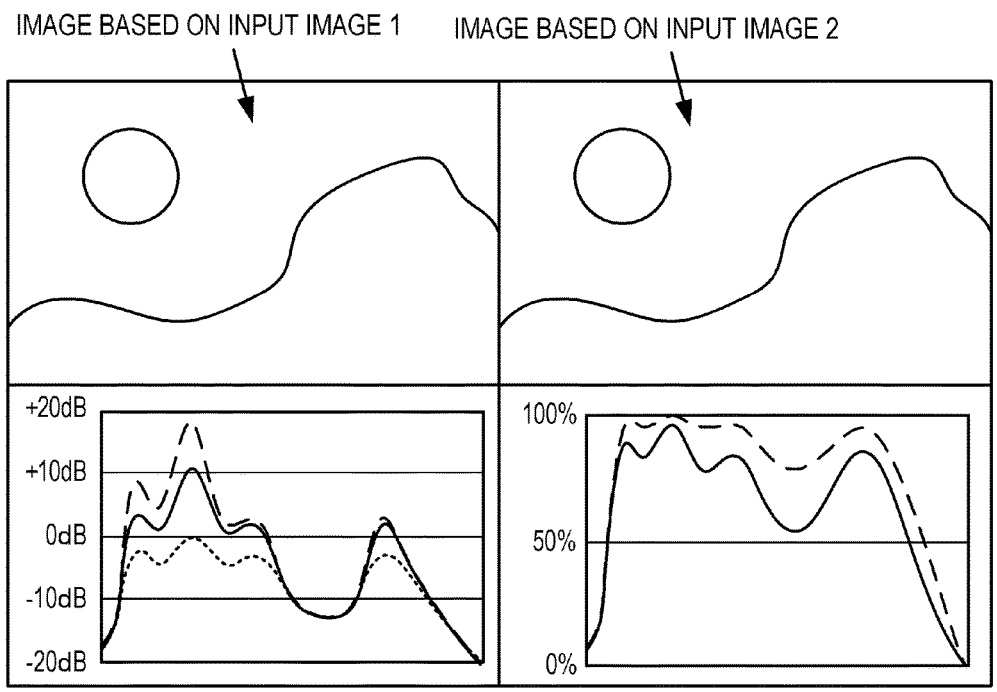
FIGS. 18A and 18B are diagrams illustrating examples of a display image according to a fourth embodiment.

FIG. 18A is a diagram illustrating an example of a display image according to the present embodiment. Such a display image as illustrated in FIG. 18A is displayed, for example, in a case where a predetermined display mode (multi-screen and multi-waveform display mode) is set as a display mode of the image display apparatus. In a case where a plurality of image data corresponding to a plurality of EOTFs are obtained during mastering, the user may check and compare a plurality of brightness distributions of the plurality of image data. The multi-screen and multi-waveform display mode is set in such a case, for example. The example of FIG. 18A corresponds to the following state.

Input characteristic 11 of input image 1: Standard A (Hybrid-γ)

Input characteristic 12 of input image 2: Standard B

Axial characteristic 31 (vertical axis of left-side waveform image): dB

Axial characteristic 32 (vertical axis of right-side waveform image): Value

Axial characteristic 31 (left-side waveform image) and drawing characteristic 21 corresponding to input image 1: Automatic Drawing characteristic 22 corresponding to left-side waveform image and input image 1: γ2.4

Drawing characteristic 23 corresponding to left-side waveform image and input image 2: Automatic Drawing characteristic 24 corresponding to left-side waveform image and input image 2: None Axial characteristic 32 (right-side waveform image) and drawing characteristic 25 corresponding to input image 1: Automatic Drawing characteristic 26 corresponding to right-side waveform image and input image 1: None Drawing characteristic 27 corresponding to right-side waveform image and input image 2: Automatic Drawing characteristic 28 corresponding to right-side waveform image and input image 2: None As described above, according to the present embodiment, the distribution information is generated by the same method as the first embodiment. As a result, it is possible to improve the convenience with which the information indicating the brightness distribution of the image data is used. Moreover, according to the present embodiment, the distribution information corresponding to the axial characteristic information is generated for each of a plurality of axial characteristic information. In this way, it is possible to further improve the convenience. For example, a plurality of distribution images corresponding to a plurality of vertical axes can be displayed. As a result, the user can check a plurality of distribution images corresponding to a plurality of vertical axes and determine the brightness distribution of the image data more accurately. Furthermore, according to the present embodiment, the distribution information corresponding to the input image data is generated for each of a plurality of input image data. In this way, it is possible to further improve the convenience. For example, it is possible to display a plurality of distributions (distributions of brightness-related values) corresponding to a plurality of image data. As a result, the user can easily determine and compare the brightness distributions of the plurality of image data.

The first to fourth embodiments are examples only, and the present invention embraces a configuration obtained by appropriately modifying and changing the configurations of the first to fourth embodiments within the scope of the spirit of the present invention. The present invention also embraces a configuration obtained by appropriately combining the configurations of the first to fourth embodiments.

Figure 18B:
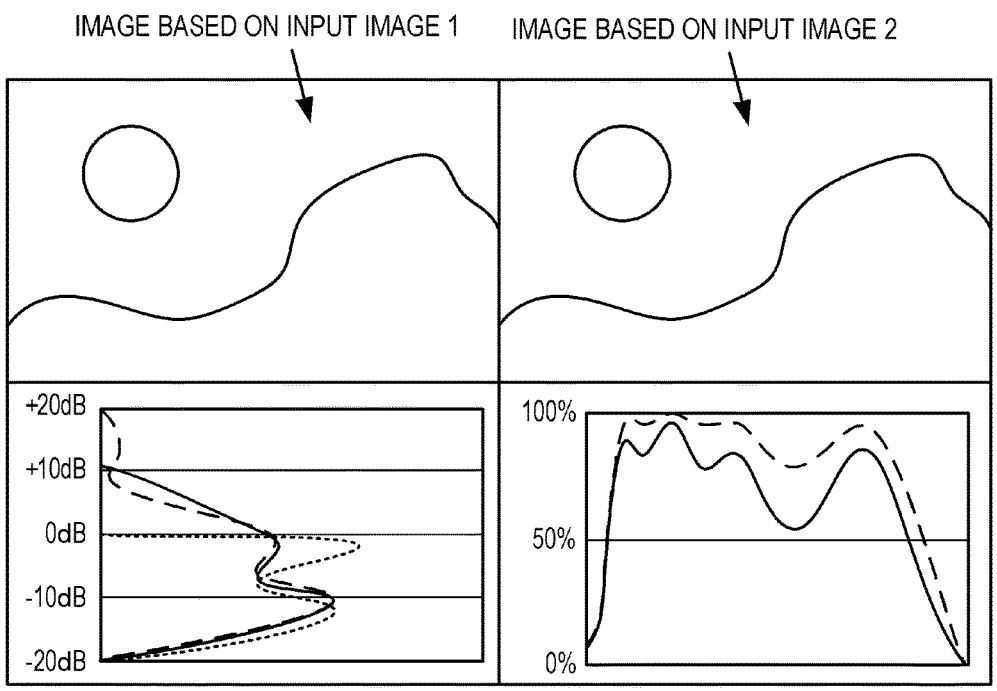

For example, the distribution of the brightness-related value only may be displayed rather than displaying the combined image together. A waveform monitor that does not have a function of displaying images using image data may be used instead of the image display apparatus. Moreover, a histogram image indicating the histogram of the brightness-related value may be used as the distribution image rather than the waveform image. FIG. 18B is a diagram illustrating an example of the display image according to the fourth embodiment. The distribution image on the left side of FIG. 18B is an example of a histogram image. In a case where distribution information is used for displaying a histogram image, the process related to the second axis (the axis having graduations corresponding to the positions in an image) may be omitted.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to readout and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-034487, filed on Feb. 25, 2016, which is hereby incorporated by reference herein in its entirety.

What is claimed is:

1. An information-processing apparatus comprising:
a first acquisition unit configured to acquire gradation characteristic information which is information related to a gradation characteristic;
a second acquisition unit configured to acquire axial characteristic information which is information related to an axial characteristic including a distribution, on an axis, of graduations corresponding to brightness-related values related to brightness of input image data; and
a generation unit configured to generate, based on the input image data, the gradation characteristic information, and the axial characteristic information, distribution information indicating a distribution of the brightness-related value of the input image data using the axis according to the axial characteristic information,
wherein the first acquisition unit, the second acquisition unit, and the generation unit are implemented via at least one processor.

2. The information-processing apparatus according to claim 1, wherein the first acquisition unit acquires a plurality of gradation characteristic information,
wherein for each of the plurality of gradation characteristic information, the generation unit generates distribution information corresponding to the gradation characteristic information, and
wherein the axis used for indicating the distribution of the brightness-related value is common among the plurality of distribution information corresponding to the plurality of gradation characteristic information.

3. The information-processing apparatus according to claim 1, wherein the axial characteristic further includes a type of the brightness-related value.

4. The information-processing apparatus according to claim 1, wherein the gradation characteristic information is information on a gradation characteristic designated by a user or information on a gradation characteristic pre-associated with the input image data.

5. The information-processing apparatus according to claim 1, wherein the axial characteristic information is information on an axial characteristic designated by a user.

6. The information-processing apparatus according to claim 1, wherein the generation unit (a) determines, based on the gradation characteristic information, a corresponding brightness which is a brightness corresponding to a data value that the input image data can take, and (b) generates the distribution information based on the input image data, a result of determining the corresponding brightness, and the axial characteristic information.

7. The information-processing apparatus according to claim 1, wherein the distribution information is information relating to a waveform indicating the distribution of the brightness-related value using a first axis which is the axis and a second axis having graduations corresponding to positions in an image.

8. The information-processing apparatus according to claim 1, wherein the generation unit (a) generates a histogram of a data value of the input image data based on the input image data, and (b) generates, based on the gradation characteristic information and the axial characteristic information, the distribution information by converting a category of the histogram from a data category, which is a category of the data value, to a graduations category, which is a category of the graduations of the axis according to the axial characteristic information.

9. The information-processing apparatus according to claim 8, wherein the generation unit (a) determines, based on the gradation characteristic information, a corresponding brightness which is a brightness corresponding to a data value that the input image data can take, and (b) converts the data category to the graduations category based on a result of determining the corresponding brightness and the axial characteristic information.

10. The information-processing apparatus according to claim 1, wherein the generation unit (a) determines, based on the gradation characteristic information and the axial characteristic information, a graduations category which is a category of the graduations of the axis according to the axial characteristic information, the graduations category corresponding to a data value that the input image data can take, and (b) generates, as the distribution information, a histogram of a graduations category obtained by converting the data value of the input image data, based on a result of determining the graduations category and the input image data.

11. The information-processing apparatus according to claim 1, wherein the generation unit (a) determines, based on the gradation characteristic information and the axial characteristic information, a graduations category which is a category of the graduations of the axis according to the axial characteristic information, the graduations category corresponding to a data value that the input image data can take, (b) generates converted image data by converting a data value of the input image data to a graduations category based on a result of determining the graduations category, and (c) generates, based on the converted image data, a histogram of the graduations category of the converted image data as the distribution information.

12. The information-processing apparatus according to claim 10, wherein the generation unit (a) determines, based on the gradation characteristic information, a corresponding brightness which is a brightness corresponding to the data value that the input image data can take, and (b) determines, based on a result of determining the corresponding brightness and the axial characteristic information, the graduations category corresponding to the data value that the input image data can take.

13. The information-processing apparatus according to claim 1, wherein the second acquisition unit acquires a plurality of axial characteristic information, and
wherein for each of the plurality of axial characteristic information, the generation unit generates distribution information corresponding to the axial characteristic information.

14. The information-processing apparatus according to claim 1, wherein for each of a plurality of input image data, the generation unit generates distribution information corresponding to the input image data.

15. An information-processing method comprising:
acquiring gradation characteristic information which is information related to a gradation characteristic;
acquiring axial characteristic information which is information related to an axial characteristic including a distribution, on an axis, of graduations corresponding to brightness-related values related to brightness of input image data; and
generating, based on the input image data, the gradation characteristic information, and the axial characteristic information, distribution information indicating a distribution of the brightness-related value of the input image data using the axis according to the axial characteristic information.

16. A non-transitory computer-readable medium that stores a program, wherein the program causes a computer to execute a method comprising:
acquiring gradation characteristic information which is information related to a gradation characteristic;
acquiring axial characteristic information which is information related to an axial characteristic including a distribution, on an axis, of graduations corresponding to brightness-related values related to brightness of input image data; and
generating, based on the input image data, the gradation characteristic information, and the axial characteristic information, distribution information indicating a distribution of the brightness-related value of the input image data using the axis according to the axial characteristic information.

* * * * *